United States Patent
Yu et al.

(10) Patent No.: US 11,163,897 B2
(45) Date of Patent: Nov. 2, 2021

(54) METHOD AND APPARATUS FOR IMAGE DISPLAY USING PRIVACY MASKING

(71) Applicant: Hangzhou Hikvision Digital Technology Co., Ltd., Zhejiang (CN)

(72) Inventors: Hai Yu, Zhejiang (CN); Shiliang Pu, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/469,909

(22) PCT Filed: Jul. 5, 2017

(86) PCT No.: PCT/CN2017/091843
§ 371 (c)(1),
(2) Date: Jun. 14, 2019

(87) PCT Pub. No.: WO2018/107729
PCT Pub. Date: Jun. 21, 2018

(65) Prior Publication Data
US 2019/0318106 A1    Oct. 17, 2019

(30) Foreign Application Priority Data

Dec. 16, 2016   (CN) .......................... 201611168947.9

(51) Int. Cl.
*H04N 5/44* (2011.01)
*G06F 21/62* (2013.01)
(Continued)

(52) U.S. Cl.
CPC ........ *G06F 21/6209* (2013.01); *G06F 21/602* (2013.01); *H04N 5/2252* (2013.01);
(Continued)

(58) Field of Classification Search
CPC . G06F 21/602; G06F 21/6209; G08B 13/196; H04N 21/2347; H04N 21/4405;
(Continued)

(56) References Cited

U.S. PATENT DOCUMENTS

| 6,937,730 B1 | 8/2005 | Buxton |
| 9,137,478 B2 * | 9/2015 | Yokote .................. G06F 1/1601 |

(Continued)

FOREIGN PATENT DOCUMENTS

| CN | 101389005 A | 3/2009 |
| CN | 103167216 A | 6/2013 |

(Continued)

OTHER PUBLICATIONS

Extended European Search Report issued in the corresponding EP Patent Application No. EP17880938.0, dated Oct. 1, 2019.

*Primary Examiner* — Jessica M Prince

(57) ABSTRACT

The present application discloses a method and an apparatus for displaying an image based on privacy masking, which belong to the field of video monitoring. The method includes: acquiring a to-be-masked original image provided by an image capture terminal and privacy masking area information of the original image; wherein, the privacy masking area information is obtained by identifying the original image or is obtained from the image capture terminal and indicates an area in the original image which is required to be masked; determining whether the original image is required to be privacy-masked based on whether privacy unmasking permission information is stored; if the original image is required to be privacy-masked, performing privacy-masking on the original image based on the privacy masking area information to obtain a masked image, and displaying the masked image. In this way, the image capture terminal is only required to provide an original image without providing the original image and the masked image, (Continued)

so the costs of both storage and transmission are low, saving the storage resources and network resources of the image capture terminal.

16 Claims, 7 Drawing Sheets

(51) Int. Cl.
  *G06F 21/60* (2013.01)
  *H04N 5/225* (2006.01)
  *H04N 5/64* (2006.01)
  *H04N 21/2347* (2011.01)
  *H04N 21/4405* (2011.01)
(52) U.S. Cl.
  CPC .................. *H04N 5/44* (2013.01); *H04N 5/64* (2013.01); *H04N 21/2347* (2013.01); *H04N 21/4405* (2013.01)
(58) Field of Classification Search
  CPC ......... H04N 21/45455; H04N 21/4627; H04N 5/2252; H04N 5/44; H04N 5/64; H04N 7/18
  See application file for complete search history.

(56) References Cited

U.S. PATENT DOCUMENTS

| | | | | |
|---|---|---|---|---|
| 9,781,451 | B2 * | 10/2017 | Martin | ............... H04N 21/4405 |
| 2010/0149330 | A1 * | 6/2010 | Salgar | .............. G08B 13/19686 |
| | | | | 348/143 |
| 2011/0085035 | A1 * | 4/2011 | Choi | ..................... H04N 19/159 |
| | | | | 348/143 |
| 2011/0145574 | A1 | 6/2011 | Ju et al. | |
| 2012/0293654 | A1 | 11/2012 | Ikegami | |
| 2014/0313699 | A1 * | 10/2014 | Kamepalli | ............... G09G 3/00 |
| | | | | 362/97.4 |
| 2015/0009325 | A1 * | 1/2015 | Kardashov | ............. H04N 7/183 |
| | | | | 348/143 |

FOREIGN PATENT DOCUMENTS

| | | |
|---|---|---|
| CN | 105208340 A | 12/2015 |
| EP | 2739051 | 6/2014 |
| EP | 2874396 A1 | 5/2015 |
| EP | 3026897 | 6/2016 |
| JP | 2005286468 A | 10/2005 |
| WO | 2014056171 A1 | 4/2014 |

* cited by examiner

METHOD AND APPARATUS FOR IMAGE DISPLAY USING PRIVACY MASKING

The present application claims the priority to a Chinese Patent Application No. 201611168947.9, filed with the China National Intellectual Property Administration on Dec. 16, 2016 and entitled "METHOD AND APPARATUS FOR IMAGE DISPLAY USING PRIVACY MASKING", which is incorporated into the present application by reference in its entirety.

TECHNICAL FIELD

The embodiments of the present invention relate to the field of video monitoring, and in particular, to a method and an apparatus for displaying an image based on privacy masking.

BACKGROUND

With increasing attention of the public to the privacy protection, the privacy masking is widely applied in the field of monitoring. Privacy masking is a method for masking or obscuring a local position in a monitoring image in order to protect personal privacy, which is mainly applied to an image capture terminal, such as a monitoring camera installed in a public place or a private place. After performing privacy masking on the captured image, the image capture terminal may send the masked image to a player terminal for displaying.

In the prior art, in order to facilitate user's viewing, the image capture terminal may provide an original image and a masked image. Specifically, the image capture terminal may capture an image of the monitored scene to obtain an original image, acquire a privacy area manually configured by the user for the original image or automatically identify a privacy area in the image, and mask or obscure the privacy area in the original image to obtain a masked image. A first multimedia stream encapsulated with the original image may be obtained by encoding and encapsulating the original image, and a second multimedia stream encapsulated with the masked image may be obtained by encoding and encapsulating the masked image. Subsequently, the first multimedia stream or the second multimedia stream is selectively sent to the player terminal by identifying a viewing permission of the player terminal. When receiving the first multimedia stream, the player terminal may play the original image by decapsulating and decoding the first multimedia stream, and when receiving the second multimedia stream, the player terminal may play the masked image by decapsulating and decoding the second multimedia stream.

In the prior art, since the image capture terminal is required to provide an original image and a masked image, the costs of storage and transmission are high, and thus wasting the storage resources and network resources in the image capture terminal.

SUMMARY

In order to solve the problem of high storage and transmission resource occupation in the related art, the embodiments of the present application provide a method and apparatus for displaying an image based on privacy masking. The following technical solutions are provided.

In a first aspect, a method for displaying an image based on privacy masking is provided. The method includes:

acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image; and if the original image is required to be privacy-masked, performing privacy-masking on the original image based on the privacy masking area information to obtain a masked image, and displaying the masked image.

Combining with the first aspect, in a first possible implement manner of the above first aspect, the method further includes:

if the original image is not required to be privacy-masked, displaying the original image.

Combining with the first aspect, in a second possible implement manner of the above first aspect, the original image is an image captured by the image capture terminal or an original masked image obtained through performing privacy-masking on the captured image by the image capture terminal based on first masking area information; wherein the first masking area information is configured by the image capture terminal.

Combining with the first aspect, in a third possible implement manner of the above first aspect, determining whether the original image is required to be privacy-masked based on whether privacy unmasking permission information is stored includes:

determining whether the privacy unmasking permission information is stored;

if the privacy unmasking permission information is stored, determining that the original image is not required to be privacy-masked;

if the privacy unmasking permission information is not stored, determining that the original image is required to be privacy-masked.

Combining with the first aspect, in a fourth possible implement manner of the above first aspect, before determining whether the privacy unmasking permission information is stored, the method further includes:

receiving the authentication information;

determining whether the authentication information conforms to a privacy unmasking permission; wherein the privacy unmasking permission is a permission that the original image is not to be privacy-masked, and the privacy unmasking permission is a permission carried in the original image or a set default permission;

if the authentication information conforms to the privacy unmasking permission, generating and storing the privacy unmasking permission information.

Combining with the first aspect, in a fifth possible implement manner of the above first aspect, the privacy masking area information comprises: first masking area information and/or second masking area information; the first masking area information is configured by the image capture terminal, and the second masking area information is obtained by identifying the original image; and determining whether the original image is required to be privacy-masked based on whether privacy unmasking permission information is stored includes:

if the first unmasking permission information is stored, determining that a first masking area in the original image is not required to be privacy-masked; wherein, the first unmasking permission information indicates that the first masking area is not required to be privacy-masked, and the first masking area is an area indicated by the first masking area information; and/or, if the second unmasking permission information is stored, determining that a second masking area in the original image is not required to be privacy-masked; wherein, the second unmasking permission information indicates that the second masking area is not required to be privacy-masked, and the second masking area is an area indicated by the second masking area information;

wherein, the first unmasking permission information and the second unmasking permission information are privacy unmasking permission information.

Combining with the first aspect, in a sixth possible implement manner of the above first aspect, before determining whether the original image is required to be privacy-masked based on whether privacy unmasking permission information is stored, the method further includes:

receiving the authentication information;

if the authentication information conforms to a first unmasking permission, generating and storing the first unmasking permission information; wherein, the first unmasking permission is a permission that the first masking area in the original image is not to be privacy-masked;

if the authentication information conforms to a second unmasking permission, generating and storing the second unmasking permission information, wherein, the second unmasking permission a permission that the second masking area in the original image is not to be privacy-masked; and wherein, the first unmasking permission and the second unmasking permission are permissions carried in the original image or set default permissions.

Combining with the first aspect, in a seventh possible implement manner of the above first aspect, acquiring a to-be-masked original image provided by an image capture terminal and privacy masking area information of the original image includes:

acquiring a first multimedia stream generated by the image capture terminal; wherein, the first multimedia stream is obtained through encapsulating the original image by the image capture terminal;

decapsulating the first multimedia stream to obtain a first encrypted code stream;

decrypting the first encrypted code stream by using a code stream key of the first encrypted code stream to obtain a first compressed code stream;

decoding the first compressed code stream to obtain the original image; and identifying the original image to obtain the privacy masking area information.

Combining with the first aspect, in an eighth possible implement manner of the above first aspect, acquiring a to-be-masked original image provided by an image capture terminal and privacy masking area information of the original image includes:

acquiring a second multimedia stream generated by the image capture terminal; wherein, the second multimedia stream is obtained through encapsulating the original image and the privacy masking area information of the original image by the image capture terminal;

decapsulating the second multimedia stream to obtain a second encrypted code stream and the privacy masking area information;

decrypting the second encrypted code stream by using a code stream key of the second encrypted code stream to obtain a second compressed code stream; and decoding the second compressed code stream to obtain the original image.

In a second aspect, a method for displaying an image based on privacy masking is provided. The method includes:

acquiring a to-be-masked original image;

acquiring privacy masking area information of the original image; wherein, the privacy masking area information indicates an area in the original image which is required to be masked; and providing the original image and the privacy masking area information to a player terminal, so that the player terminal determines whether to perform privacy-masking on the original image based on the privacy masking area information.

Combining with the second aspect, in a first possible implement manner of the above second aspect, acquiring a to-be-masked original image includes:

acquiring an image captured for a monitored scene, and determining the captured image as the original image; or acquiring an image captured for a monitored scene; acquiring configured first masking area information; performing privacy-masking on the captured image based on the first masking area information to obtain an original masked image; and determining the original masked image as the original image.

Combining with the second aspect, in a second possible implement manner of the above second aspect, providing the original image and the privacy masking area information to a player terminal includes:

encoding the original image to obtain a compressed code stream;

encrypting the compressed code stream to obtain an encrypted code stream;

encapsulating the encrypted code stream and the privacy masking area information to obtain a multimedia stream; and providing the multimedia stream to the player terminal.

Combining with the second aspect, in a third possible implement manner of the above second aspect, acquiring privacy masking area information of the original image includes:

determining configured first masking area information as the privacy masking area information of the original image; and/or identifying the original image to obtain second masking area information, and determining the second masking area information as the privacy masking area information of the original image.

Combining with the second aspect, in a fourth possible implement manner of the above second aspect, before providing the original image and the privacy masking area information to a player terminal, the method further includes:

when the privacy masking area information of the original image is the first masking area information and/or the second masking area information, setting a permission that the original image is not to be privacy-masked as a privacy unmasking permission; or when the privacy masking area information of the original image is the first masking area information and/or the second masking area information, setting a permission that a first masking area in the original image is not to be privacy-masked as a first unmasking permission, and/or setting a permission that a second masking area in the original image is not to be privacy-masked as a second unmasking permission; wherein, the first masking area is an area indicated by the first masking area information, and the second masking area is an area indicated by the second masking area information.

In a third aspect, an apparatus for displaying an image based on privacy masking is provided. The apparatus includes:

an acquisition module, configured for acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

a first judgment module, configured for determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image;

a first display module, configured for, if the original image is required to be privacy-masked, performing privacy-masking on the original image based on the privacy masking area information to obtain a masked image, and displaying the masked image.

Combining with the third aspect, in a first possible implement manner of the above third aspect, the apparatus further includes:

a second display module, configured for, if the original image is not required to be privacy-masked, displaying the original image.

Combining with the third aspect, in a second possible implement manner of the above third aspect, the original image is an image captured by the image capture terminal or an original masked image obtained through performing privacy-masking on the captured image by the image capture terminal based on first masking area information; wherein the first masking area information is configured by the image capture terminal.

Combining with the third aspect, in a third possible implement manner of the above third aspect, the first judgment module includes:

a first judgment unit, configured for determining whether the privacy unmasking permission information is stored;

a first determination unit, configured for, if the privacy unmasking permission information is stored, determining that the original image is not required to be privacy-masked; and a second determination unit, configured for, if the privacy unmasking permission information is not stored, determining that the original image is required to be privacy-masked.

Combining with the third aspect, in a fourth possible implement manner of the above third aspect, the apparatus further includes:

a first receiving module, configured for receiving the authentication information;

a second judgment module, configured for determining whether the authentication information conforms to a privacy unmasking permission; wherein the privacy unmasking permission is a permission that the original image is not to be privacy-masked, and the privacy unmasking permission is a permission carried in the original image or a set default permission;

a first generation module, configured for, if the authentication information conforms to the privacy unmasking permission, generating and storing the privacy unmasking permission information.

Combining with the third aspect, in a fifth possible implement manner of the above third aspect, the privacy masking area information comprises: first masking area information and/or second masking area information; the first masking area information is configured by the image capture terminal, and the second masking area information is obtained by identifying the original image;

the first judgment module includes at least one of the following units:

a third determination unit, configured for, if the first unmasking permission information is stored, determining that a first masking area in the original image is not required to be privacy-masked; wherein, the first unmasking permission information indicates that the first masking area is not required to be privacy-masked, and the first masking area is an area indicated by the first masking area information;

a fourth determination unit, configured for, if the second unmasking permission information is stored, determining that a second masking area in the original image is not required to be privacy-masked; wherein, the second unmasking permission information indicates that the second masking area is not required to be privacy-masked, and the second masking area is an area indicated by the second masking area information;

wherein, the first unmasking permission information and the second unmasking permission information are privacy unmasking permission information.

Combining with the third aspect, in a sixth possible implement manner of the above third aspect, the apparatus further includes:

a second receiving module, configured for receiving the authentication information;

a second generation module, configured for, if the authentication information conforms to a first unmasking permission, generating and storing the first unmasking permission information; wherein, the first unmasking permission is a permission that the first masking area in the original image is not to be privacy-masked;

a third generation module, configured for, if the authentication information conforms to a second unmasking permission, generating and storing the second unmasking permission information, wherein, the second unmasking permission a permission that the second masking area in the original image is not to be privacy-masked; and wherein, the first unmasking permission and the second unmasking permission are permissions carried in the original image or set default permissions.

Combining with the third aspect, in a seventh possible implement manner of the above third aspect, the acquisition module includes:

a first acquisition unit, configured for acquiring a first multimedia stream generated by the image capture terminal; wherein, the first multimedia stream is obtained through encapsulating the original image by the image capture terminal;

a first decapsulation unit, configured for decapsulating the first multimedia stream to obtain a first encrypted code stream;

a first decryption unit, configured for decrypting the first encrypted code stream by using a code stream key of the first encrypted code stream to obtain a first compressed code stream;

a first decoding unit, configured for decoding the first compressed code stream to obtain the original image; and an identification unit, configured for identifying the original image to obtain the privacy masking area information.

Combining with the third aspect, in an eighth possible implement manner of the above third aspect, the acquisition module includes:

a second acquisition unit, configured for acquiring a second multimedia stream generated by the image capture terminal; wherein, the second multimedia stream is obtained through encapsulating the original image and the privacy masking area information of the original image by the image capture terminal;

a second decapsulation unit, configured for decapsulating the second multimedia stream to obtain a second encrypted code stream and the privacy masking area information;

a second decryption unit, configured for decrypting the second encrypted code stream by using a code stream key of the second encrypted code stream to obtain a second compressed code stream; and a second decoding unit, configured for decoding the second compressed code stream to obtain the original image.

In a fourth aspect, an apparatus for displaying an image based on privacy masking is provided. The apparatus includes:

a first acquisition module, configured for acquiring a to-be-masked original image;

a second acquisition module, configured for acquiring privacy masking area information of the original image; wherein, the privacy masking area information indicates an area in the original image which is required to be masked; and a providing module, configured for providing the original image and the privacy masking area information to a player terminal, so that the player terminal determines whether to perform privacy-masking on the original image based on the privacy masking area information.

Combining with the fourth aspect, in a second possible implement manner of the above fourth aspect, the first acquisition module includes at least one of the following units:

a first determination unit, configured for acquiring an image captured for a monitored scene, and determining the captured image as the original image;

a second determination unit, configured for acquiring an image captured for a monitored scene; acquiring configured first masking area information; performing privacy-masking on the captured image based on the first masking area information to obtain an original masked image; and determining the original masked image as the original image.

Combining with the fourth aspect, in a second possible implement manner of the above fourth aspect, the providing module includes:

an encoding unit, configured for encoding the original image to obtain a compressed code stream;

an encryption unit, configured for encrypting the compressed code stream to obtain an encrypted code stream;

an encapsulation unit, configured for encapsulating the encrypted code stream and the privacy masking area information to obtain a multimedia stream; and a providing unit, configured for providing the multimedia stream to the player terminal.

Combining with the fourth aspect, in a third possible implement manner of the above fourth aspect, the second acquisition module includes at least one of the following units:

a third determination unit, configured for determining configured first masking area information as the privacy masking area information of the original image;

a fourth determination unit, configured for identifying the original image to obtain second masking area information, and determining the second masking area information as the privacy masking area information of the original image.

Combining with the fourth aspect, in a fourth possible implement manner of the above fourth aspect, the apparatus further includes:

a first setting module, configured for, when the privacy masking area information of the original image is the first masking area information and/or the second masking area information, setting a permission that the original image is not to be privacy-masked as a privacy unmasking permission; or a second setting module, configured for, when the privacy masking area information of the original image is the first masking area information and/or the second masking area information, setting a permission that a first masking area in the original image is not to be privacy-masked as a first unmasking permission, and/or setting a permission that a second masking area in the original image is not to be privacy-masked as a second unmasking permission; wherein, the first masking area is an area indicated by the first masking area information, and the second masking area is an area indicated by the second masking area information.

In a fifth aspect, a player terminal is provided. The player terminal includes: a housing, a processor, a memory, a circuit board and a power circuit; wherein, the circuit board is arranged inside space surrounded by the housing; the processor and the memory are arranged on the circuit board; the power circuit is configured for supplying power to each of circuits or components of the player terminal; the memory is configured for storing an executable program code; the processor is configured to execute the executable program code stored in the memory for:

acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image; and if the original image is required to be privacy-masked, performing privacy-masking on the original image based on the privacy masking area information to obtain a masked image, and displaying the masked image.

In a sixth aspect, an image capture terminal is provided. The image capture terminal includes: a housing, a processor, a memory, a circuit board and a power circuit; wherein, the circuit board is arranged inside space surrounded by the housing; the processor and the memory are arranged on the circuit board; the power circuit is configured for supplying power to each of circuits or components of the image capture terminal; the memory is configured for storing an executable program code; the processor is configured to execute the executable program code stored in the memory for:

acquiring a to-be-masked original image;

acquiring privacy masking area information of the original image; wherein, the privacy masking area information indicates an area in the original image which is required to be masked; and providing the original image and the privacy masking area information to a player terminal, so that the player terminal determines whether to perform privacy-masking on the original image based on the privacy masking area information.

In a seventh aspect, an executable program code is provided. The executable program code is configured for, when being executed, implementing the following steps:

acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image; and if the original image is required to be privacy-masked, performing privacy-masking on the original image based on the privacy masking area information to obtain a masked image, and displaying the masked image.

In an eighth aspect, an executable program code is provided. The executable program code is configured for, when being executed, implementing the following steps:

acquiring a to-be-masked original image;

acquiring privacy masking area information of the original image; wherein, the privacy masking area information indicates an area in the original image which is required to be masked; and providing the original image and the privacy masking area information to a player terminal, so that the player terminal determines whether to perform privacy-masking on the original image based on the privacy masking area information.

In a ninth aspect, a storage medium is provided. The storage medium is configured for storing an executable program code, and the executable program code is configured for, when being executed, implementing the following steps:

acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image; and if the original image is required to be privacy-masked, performing privacy-masking on the original image based on the privacy masking area information to obtain a masked image, and displaying the masked image.

In a tenth aspect, a storage medium is provided. The storage medium is configured for storing an executable program code, and the executable program code is configured for, when being executed, implementing the following steps:

acquiring a to-be-masked original image;

acquiring privacy masking area information of the original image; wherein, the privacy masking area information indicates an area in the original image which is required to be masked; and providing the original image and the privacy masking area information to a player terminal, so that the player terminal determines whether to perform privacy-masking on the original image based on the privacy masking area information.

Technical solutions provided by the embodiments of the present application have the following beneficial effects.

In the embodiments of the present application, a to-be-masked original image provided by an image capture terminal and privacy masking area information of the original image may be acquired; wherein, the privacy masking area information may be obtained by identifying the original image or be obtained from the image capture terminal and indicate an area in the original image which is required to be masked; then, it may be determined whether the original image is required to be privacy-masked based on whether privacy unmasking permission information is stored; if the original image is required to be privacy-masked, privacy-masking is performed on the original image based on the privacy masking area information to obtain a masked image. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

BRIEF DESCRIPTION OF THE DRAWINGS

In order to more clearly describe the technical solutions in embodiments of the present application, accompanying drawings that is used in embodiments will be briefly described below. Obviously, accompanying drawings described below are for only some of embodiments of the present application; those skilled in the art may also obtain other accompanying drawings based on these accompanying drawings without any creative efforts.

DETAILED DESCRIPTION

In order to make the objects, technical solutions and advantages of the present application more clear, the implementation manners of the present application will be further described in detail below with reference to the accompanying drawings.

Figure 1A:
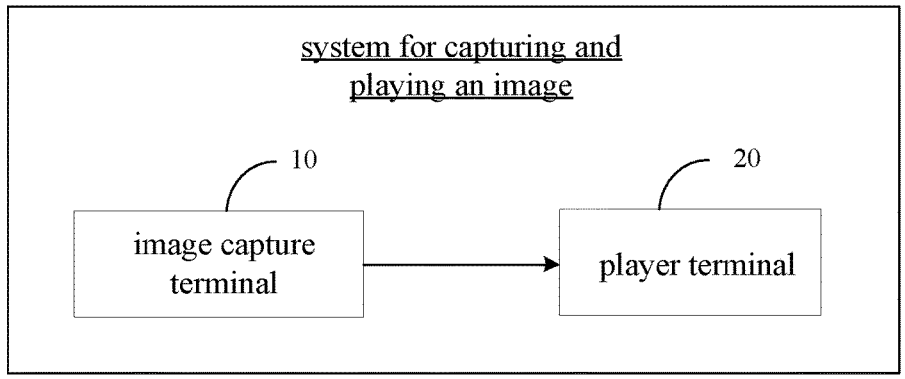
FIG. 1A is a schematic diagram of a system for capturing and playing an image according to an embodiment of the present application.

Before the detailed description of the embodiments of the present application, the application scenes of the embodiments of the present application are introduced firstly. The method provided by the embodiment of the present application is applied to a system for capturing and playing an image. Referring to FIG. 1A, a system for capturing and playing an image includes an image capture terminal 10 and a player terminal 20. The image capture terminal 10 may not be connected to the player terminal 20, and may also be connected to the player terminal 20 via a wired network or a wireless network, as shown in FIG. 1A, which is not limited in this embodiment of the present application.

The image capture terminal 10 is configured for capturing an image and providing the image to the player terminal 20, and the player terminal 20 is configured for displaying the image. The image may be provided in the following manner the image capture terminal 10 capturing an image and storing the image, and the player terminal 20 acquiring the stored image from the image capture terminal 10, for example, copying the stored image; or, the image capture terminal 10 capturing an image and sending the captured image to the player terminal 20.

It should be noted that the image captured and played by the system for capturing and playing an image may be an image, such as a captured photograph; or a frame image of a multimedia video. That is, the image capture terminal may capture a video and provide the video to the player terminal, and the player terminal plays the video, which is not limited in this embodiment of the present application.

Further, the system for capturing and playing an image may also be a system for encoding and decoding a video. Correspondingly, the image capture terminal 10 may also be a capture and encoding terminal, and may capture an image and encode the image to obtain a multimedia stream. The player terminal 20 may be a decoding and player terminal, and may decode and play the multimedia stream provided by the capture and encoding terminal.

Specifically, the system for capturing and playing an image may be a video monitoring system. Accordingly, the image capture terminal 10 may be a monitoring camera, such as a fixed camera, or a movable camera such as a ball machine, a PTZ camera or the like. The player terminal 20 may be a terminal having a display function, such as a mobile phone, a computer, a tablet, or the like. Alternatively, the system for capturing and playing an image may also be a video conferencing system, a video broadcast system, etc. Correspondingly, the image capture terminal 10 may be a device with a camera, and the player terminal 20 may be a mobile phone, a computer, a set top box, a television, a digital media player, video game console, etc.

It should be noted that in the embodiment of the present application, only two devices of an image capture terminal 10 and a player terminal 20 are described. In an actual application, the capture terminal 10 and the player terminal 20 may also be integrated into one device, which has the functions of the capture terminal 10 and the player terminal 20. For example, an integrated device may be a camera that may both capture an image and display the captured image.

In addition, it should be noted that, in order to protect public privacy, the related image capture terminal 10 generally may perform privacy-masking on the acquired original image. The current privacy masking methods mainly include two categories.

1. Manually configuring a masking area. The user may set a partial area in an image as an area that is required to be masked, i.e., a privacy masking area, through a specific setting interface. For example, in a scenario of monitoring a public place, in order to avoid exposing indoor privacy due to monitoring of a door and window of home, a fixed area such as the door, the window may be set as a privacy masking area.

For a fixed camera, since the captured scene is fixed, the currently set area may be directly used as a privacy masking area that is required to be masked in the image. For the movable camera, since the captured image changes with the rotation of the camera, after the user sets a privacy masking area in a certain initial position, with the rotation of the camera, the movable camera may calculate the position where the initial setting area should appear in the current image based on available information such as magnification, orientation of the camera, etc., and use the calculated position area as the privacy masking area that is required to be masked in the current image.

2. Intelligently identifying a masking area. An intelligent identification method such as computer vision is used to intelligently detect the captured original image, identify a motion area or a specific target therein, and determine an area in which the identified motion area or specific target is located as the privacy masking area to-be-masked. For example, an area in which a person or a vehicle appears in the image is located may be identified as a privacy masking area.

However, in the current privacy masking method, the configured or identified privacy masking area has been privacy-masked before the encoding and compression, so that the player terminal can only display the masked image and cannot extract essential information from the original image when needed. In order to solve the problem in the related art, in the above system for capturing and playing an image, the image capture terminal 10 may acquire the to-be-masked original image and directly provide the original image to the player terminal 20; the player terminal 20 identifies the original image to obtain the privacy masking area information of the original image, and determines whether the original image is privacy-masked based on the privacy masking area information. Alternatively, the image capture terminal 10 acquires the to-be-masked original image, acquires the privacy masking area information of the original image, and provides the original image and the privacy masking area information to the player terminal 20, and the player terminal 20 determines whether to perform privacy-masking on the original image based on the privacy masking area information.

Figure 1B:
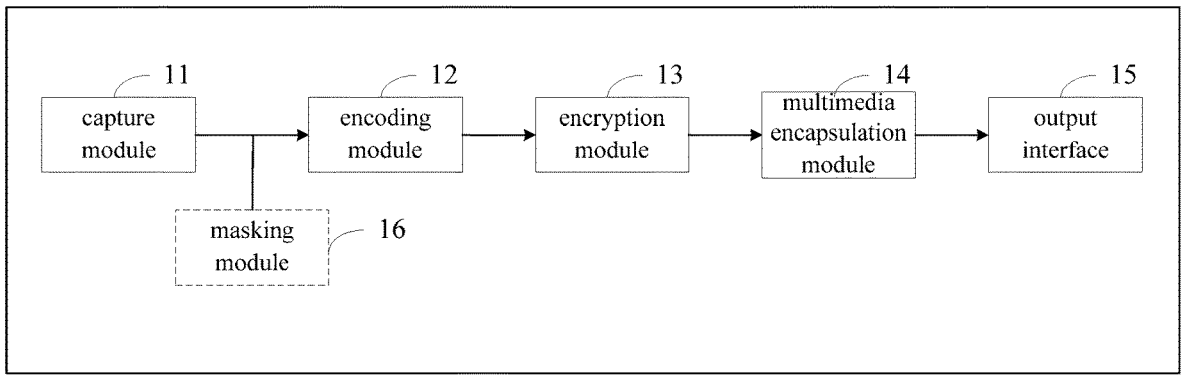
FIG. 1B is a schematic structural diagram of an image capture terminal 10 according to an embodiment of the present application.

FIG. 1B is a schematic structural diagram of an image capture terminal 10 according to an embodiment of the present application. Referring to FIG. 1B, the image capture terminal 10 includes a capture module 11, an encoding module 12, an encryption module 13, a multimedia encapsulation module 14, and an output interface 15.

The capture module 11 is configured for sensing and imaging optical information, i.e., converting light information of a scene into an image, and the output thereof is generally original bitmap image information, such as a YUV (a color standard) color mode or an RGB (a color standard) color mode or the like. The capture module 11 may be a photographic camera capturing module group or device, such as a camera.

The encoding module 12 is configured for encoding an input image to form a compressed code stream in order to reduce the amount of transmitted data.

The encryption module 13 is configured for encrypting the transmitted information to ensure the security of the information.

The multimedia encapsulation module 14 is configured for mixedly encapsulate information of different attributes such as videos, audios, and structured descriptors (such as subtitles) to obtain a multimedia stream, so as to facilitate control and synchronization of the streaming media.

The output interface 15 is configured for communicating with other devices and outputting information to other devices, which may be a transmitter or the like. For example, an image or a multimedia stream or the like may be sent to the player terminal 20.

Optionally, referring to FIG. 1B, the image capture terminal 10 may further include a masking module 16. The masking module 16 is configured for acquiring privacy masking area information configured in the image capture terminal 10, and performing privacy-masking on the privacy masking area in the original image based on the privacy masking area information and outputting the masked image. Or, the masking module 16 may also acquire the configured privacy masking area information, and output the configured privacy masking area information to the multimedia encapsulation module 14 so that the multimedia encapsulation module 14 encapsulates the configured privacy masking area information and the image encrypted by the encryption module 13.

Figure 1C:
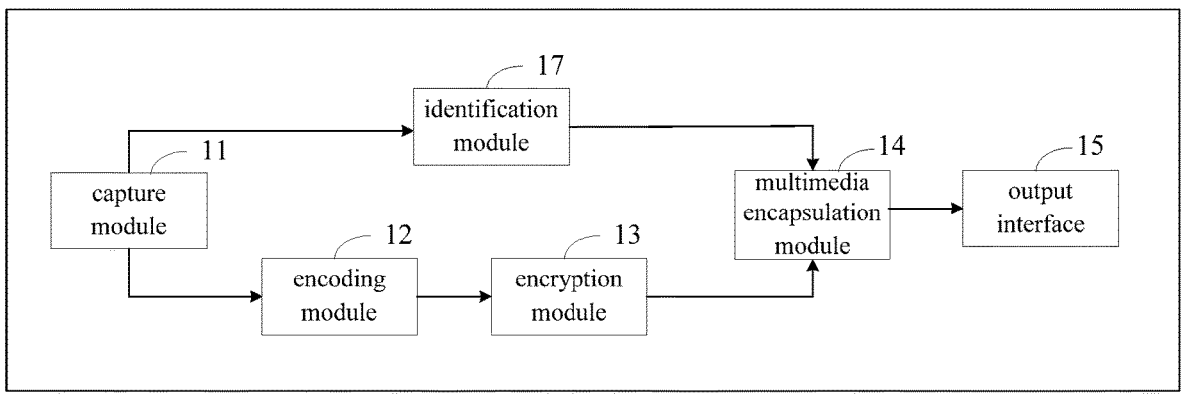
FIG. 1C is another schematic structural diagram of an image capture terminal 10 according to an embodiment of the present application.

FIG. 1C is another schematic structural diagram of an image capture terminal 10 according to an embodiment of the present application. Referring to FIG. 1C, the image capture terminal 10 may include a capture module 11, an encoding module 12, an encryption module 13, a multimedia encapsulation module 14, an output interface 15 and an identification module 17.

The identification module 17 is configured for intelligently identifying an input image to identify location information of the motion area or a specific target therein. In the embodiment of the present application, the used smart identification algorithm is not specifically limited, and a background modeling+motion detection algorithm, or a specific target detection algorithm may be preferably used. In the embodiment of the present application, the output of the identification module 17 is information of an area in which the target is located in the image, and the form of the information may be a polygon vertex coordinate, a rectangular diagonal vertex coordinate, or the like. For example, when the area in which the target is located is a rectangle, the upper left pixel coordinate (x1, y1) and the lower right pixel coordinate (x2, y2) of the rectangle may be used as an output result of the identification module 17.

In this embodiment, the identification module 17 may also intelligently identify the acquired image, and output the identified privacy masking area information to the multimedia encapsulation module 14, so that the multimedia encapsulation module 14 encapsulates the identified privacy masking area information and the image encrypted by the encryption module 13.

For convenience of description, the privacy masking area information configured by the image capture terminal 10 is referred to as first masking area information, and the privacy masking area information obtained through identifying the image by the identification module 17 is referred to as second masking area information.

Figure 1D:
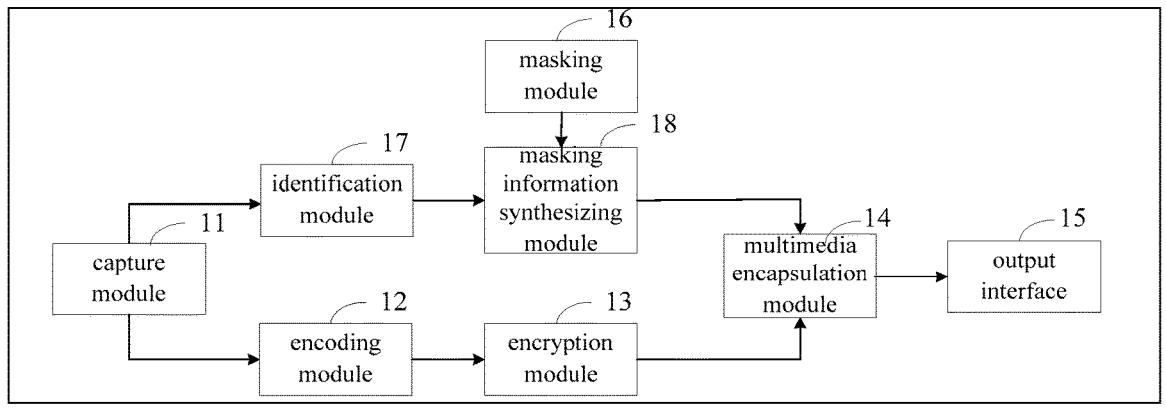
FIG. 1D is another schematic structural diagram of an image capture terminal 10 according to an embodiment of the present application.

FIG. 1D is another schematic structural diagram of an image capture terminal 10 according to an embodiment of the present application. Referring to FIG. 1D, the image capture terminal 10 may include a capture module 11, an encoding module 12, an encryption module 13, a multimedia encapsulation module 14, an output interface 15, a masking module 16, an identification module 17 and a masking information synthesizing module 18.

The masking module 16 is configured for acquiring the privacy masking area information configured in the image capture terminal 10, i.e., the first masking area information, and sending the first masking area information to the masking information synthesizing module 18.

The identification module 17 is configured for identifying the image captured by the capture module 11 and sending the identified privacy masking area information, i.e., the second masking area information, to the masking information synthesizing module 18.

The masking information synthesizing module 18 is configured for acquiring multiple forms of privacy masking area information, and synthesizing the multiple forms of privacy masking area information to obtain synthesized privacy masking area information. For example, when the image capture terminal 10 is compatible with multiple privacy masking methods, such as the above manually configuring and the intelligently identifying and the like, the masking information synthesizing module 18 may respectively acquire the first masking area information sent by the masking module 16 and the second masking area information identified by the identification module 17, and synthesize the first masking area information and the second masking area information to obtain the synthesized privacy masking area information.

It should be noted that the embodiment of the present application is only described by taking the image capture terminal 10 including the above modules as an example, but in an actual application, the above modules may be correspondingly increased, decreased, and transformed based on actual needs.

Figure 1E:
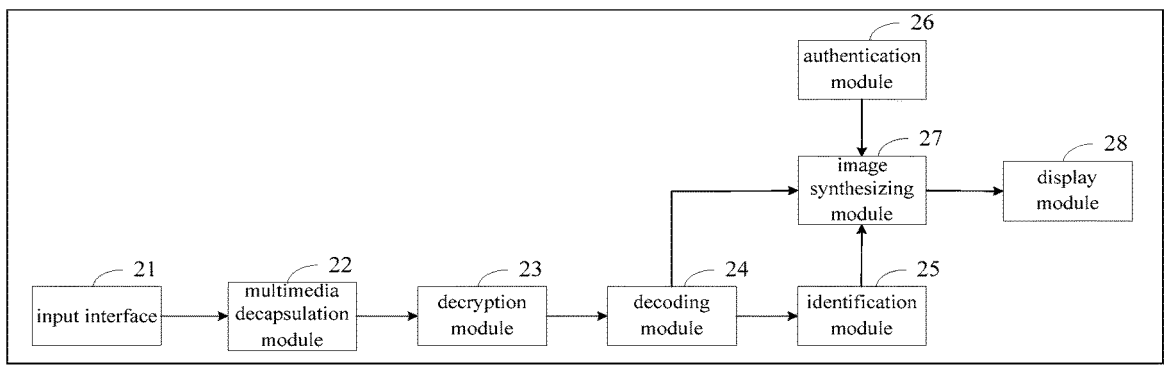
FIG. 1E is a schematic structural diagram of a player terminal 20 according to an embodiment of the present application.

FIG. 1E is a schematic structural diagram of a player terminal 20 according to an embodiment of the present application, which may be combined with the image capture terminal 10 shown in FIG. 1B to form the system for capturing and playing an image. Referring to FIG. 1E, the player terminal 20 includes an input interface 21, a multimedia decapsulation module 22, a decryption module 23, a decoding module 24, an identification module 25, an authentication module 26, an image synthesizing module 27 and a display module 28.

The input interface 21 is configured for communicating with other devices to acquire information sent by other devices, which may be a receiver or the like. For example, an image or a multimedia stream or the like sent by the image capture terminal 10 may be received.

The multimedia decapsulation module 22 corresponds to the above multimedia encapsulation module 14 and is configured for decapsulating the received multimedia stream to obtain information of different attributes such as images and audios before encapsulation. The multimedia encapsulation/decapsulation module may use a general multimedia container standard, such as MPEG2 TS/PS, RTP, or MP4 for storing files, etc., which is not limited in the embodiment of the present application. It should be noted that when encrypting a video stream, the multimedia encapsulation/decapsulation module is required to use an encapsulation/decapsulation standard that supports private information extension, such as MPEG2 TS.

The decryption module 23 corresponds to the encryption module 13 and is configured for decrypting the received encrypted information. The encryption/decryption module may use a general information encryption standard, such as AES, SM4, etc., which is not limited in the embodiment of the present application. Preferably, in the embodiment of the present application, the essential information configured for encryption and decryption, which is invisible and unknown to the user, may be separately built in the encryption module and the decryption module at both terminals, such that only a specially matched playing device can play the image, and any three-party player cannot play the image.

The decoding module 24 corresponds to the above encoding module 12, and is configured for decoding the encoded compressed code stream to obtain a restored image for display. The coding/decoding module may use a general coding standard, such as H.264/AVC, H.264/HEVC, etc., which is not limited in this embodiment of the present application.

The function of the identification module 25 is similar to function of the identification module 17 in the image capture terminal 10 described above, which is not described herein again.

The authentication module 26 is configured for authenticating the received authentication information. If, after authentication, it is determined that the authentication information conforms to the permission requirement, the authentication module 26 may generate and send out the unmasking permission information to indicate that the privacy masking is not required. If it is determined that the authentication information does not conform to the permission requirement, the authentication module 26 may not generate the unmasking permission information or may generate the unmasking prohibition information to indicate that the privacy masking is required.

The image synthesizing module 27 is configured for receiving the original image and the privacy masking area information of the original image; when the privacy masking is required, performing privacy-masking on the original image based on the privacy masking area information, and outputting the masking image; and, when the privacy masking is not required, outputting the original image. Wherein, the original image may be an image captured directly by the image capture terminal 10, i.e. the masking image, or may also be an original masking image obtained by performing privacy-masking on the captured image based on the first masking area information.

The display module 28 is configured for displaying an images or a video. The display module 28 may be one of multiple types of display apparatuses, such as a liquid crystal display (LCD), a plasma display, an organic light emitting diode (OLED) display, or other types of display devices.

Figure 1F:
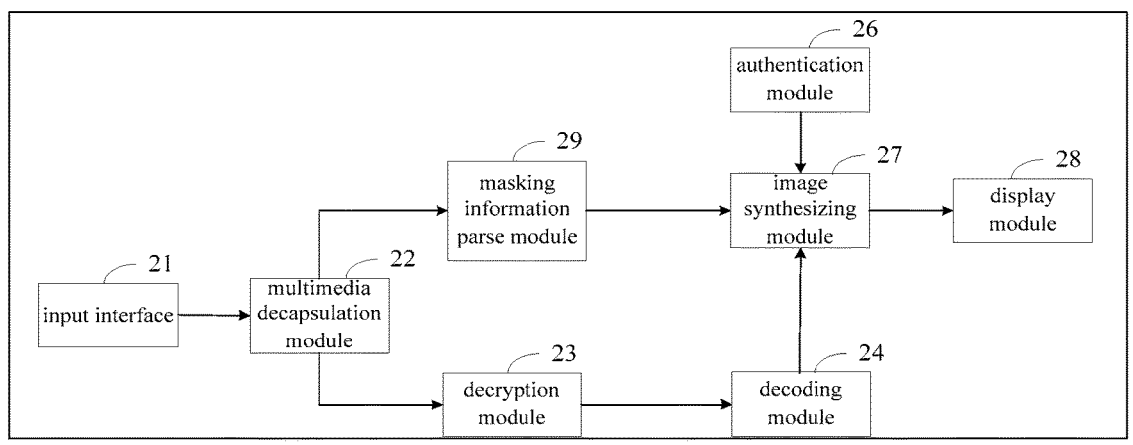
FIG. 1F is another schematic structural diagram of a player terminal 20 according to an embodiment of the present application.

FIG. 1F is another schematic structural diagram of a player terminal 20 according to an embodiment of the present application. Referring to FIG. 1F, the player terminal 20 includes an input interface 21, a multimedia decapsulation module 22, a decryption module 23, a decoding module 24, a masking information parse module 29, an authentication module 26, an image synthesizing module 27 and a display module 28.

The masking information parse module 29 is configured for parsing the privacy masking area information. Since the privacy masking area information provided by the image capture terminal 10 may be privacy masking area information in the form of a computer language, the player terminal is required to parse the privacy masking area information in the form of computer language to obtain the privacy masking area information that can be identified by the image synthesizing module 27, so that the image synthesizing module 27 obtains the range of area in the image which is required to be masked based on the privacy masking area information, thereby preparing for privacy masking in the image.

For example, for FIG. 1B, the masking information parse module 29 may parse the first masking area information provided by the image capture terminal 10. For FIG. 1C, the masking information parse module 29 may parse the second masking area information provided by the image capture terminal 10. For FIG. 1D, the masking information parse module 29 may parse the synthesized privacy masking area information provided by the image capture terminal 10.

Figure 1G:
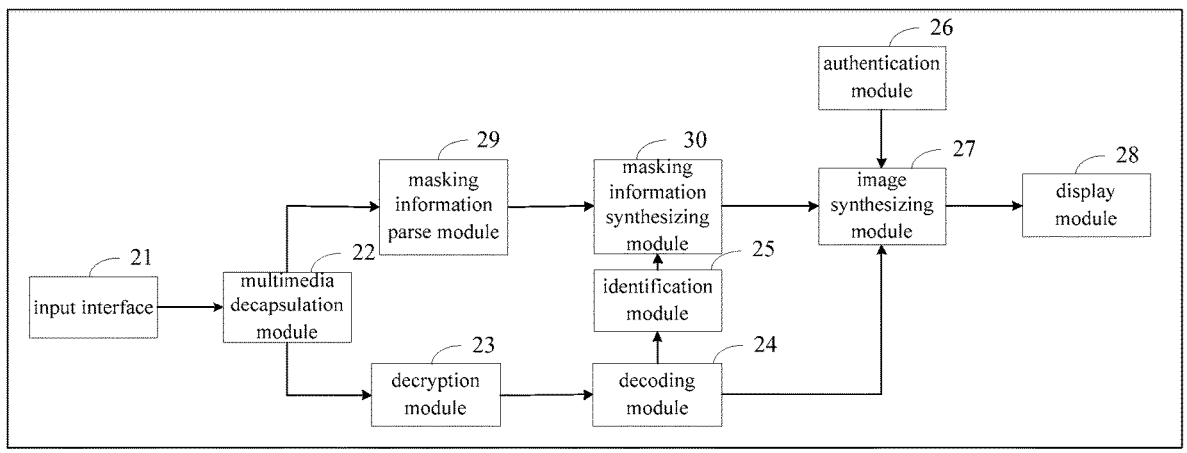
FIG. 1G is another schematic structural diagram of a player terminal 20 according to an embodiment of the present application.

FIG. 1G is another schematic structural diagram of a player terminal 20 according to an embodiment of the present application. Referring to FIG. 1G the player terminal 20 includes an input interface 21, a multimedia decapsulation module 22, a decryption module 23, a decoding module 24, an identification module 25, a masking information parse module 29, a masking information synthesizing module 30, an authentication module 26, an image synthesizing module 27 and a display module 28.

In this embodiment, the player terminal 20 may parse the first masking area information provided by the image capture terminal 10 by using the masking information parse module 29, identify the image by using the identification module 25 to obtain the second masking area information, and synthesize the first masking area information and the second masking area information by using the masking information synthesizing module 30 to obtain the synthesized privacy masking area information, so that the image synthesizing module 27 determines whether the image decoded by the decoding module 24 is required to be masked based on the synthesized privacy masking area information sent by the masking information synthesizing module 30.

It should be noted that the embodiment of the present application is only described by taking the player terminal 20 including the above modules as an example, but in an actual application, the above modules may be correspondingly increased, decreased, and transformed based on actual needs.

Figure 2:
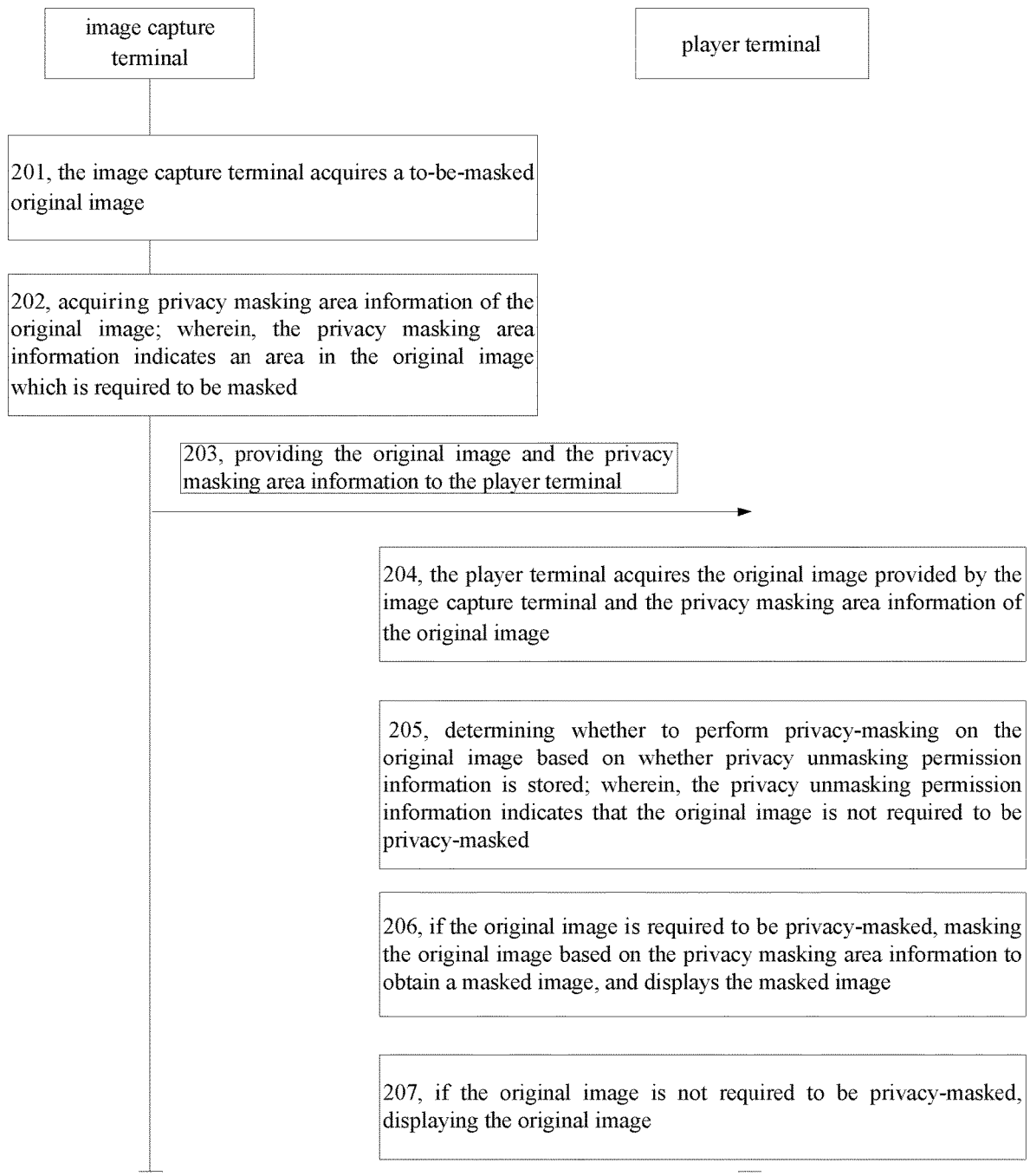
FIG. 2 is a flowchart of a method for displaying an image based on privacy masking according to an embodiment of the present application.

FIG. 2 is a flowchart of a method for displaying an image based on privacy masking according to an embodiment of the present application. Referring to FIG. 2, the method includes:

At step 201, the image capture terminal acquires a to-be-masked original image.

The original image may be an image captured by the image capture terminal, or may be an original image obtained by performing privacy-masking on the captured image based on the first masking area information. The first masking area information is configured by the image capture terminal.

Specifically, the method of acquiring the to-be-masked original image may include the following two manners.

In a first manner, an image captured for the monitored scene is acquired, and the captured image is determined as the original image. That is, the image capture terminal may convert the light information of the monitored scene into an image by capturing without masking or obscuring on the image, thereby obtaining the original image.

In a second manner, an image captured for the monitored scene is acquired, the configured first masking area information is acquired, the captured image is privacy-masked based on the first masking area information to obtain an original masked image, and the original masked image is determined as the original image.

The first masking area information is privacy masking area information determined based on a manual configuration of the user. When the image capture terminal is a fixed capture terminal, the first masking area information is the privacy masking area information manually configured by the user, such as a masking rectangular frame coordinate, a masking polygon coordinate the input by the user saved by the image capture terminal. When the image capture terminal is the movable capture terminal, the first masking area information is privacy masking area information obtained by performing movable coordinate conversion on the privacy masking area information manually configured by the user.

That is, the image capture terminal may acquire the privacy masking area information manually configured by the user, and privacy-mask the captured image based on the manually configured privacy masking area information to obtain the original image.

At step 202, the image capture terminal acquires privacy masking area information of the original image; wherein, the privacy masking area information indicates an area in the original image which is required to be masked.

As can be seen from the description of the above-described implementation environment, the current privacy masking method includes two manners: manually configuring a privacy masking area and intelligently identifying a privacy masking area. Accordingly, acquiring the privacy masking area information of the original image may include any one of the following manners.

In a first manner, the configured first masking area information is determined as the privacy masking area information of the original image.

When the original image is the captured image, the configured first masking area information may be acquired, and is determined as the privacy masking area information of the original image.

In a second manner, the original image is identified to obtain second masking area information, and the second masking area information is determined as the privacy masking area information of the original image.

For example, the second masking area information may be coordinate information of a motion area or a specific target area obtained through identifying the motion area or the specific target in the original image by the identification module 17.

When the original image is the captured image or the original masked image, the original image may be identified to obtain second masking area information, and the second masking area information is determined as the privacy masking area information of the original image.

In a third manner, the configured first masking area information is acquired, the original image is identified to obtain second masking area information, the first masking area information and the second masking area information are synthesized to obtain the synthesized privacy masking area information, and the synthesized privacy masking area information is determined as the privacy masking area information of the original image.

When the original image is the captured image, the configured first masking area information may be acquired, and is determined as the privacy masking area information of the original image.

Specifically, the method of synthesizing the first masking area information and the second masking area information may include: determining a union set of the first masking area information and the second masking area information as the privacy masking area information; or, separately describing the first masking area information and the second masking area information without a logical synthesis, and only incorporating the first masking area information and the second masking area information to obtain the privacy masking area information.

Further, the image capture terminal may also set the same privacy unmasking permission for different privacy masking area information, or set different privacy masking permissions for different privacy unmasking area information, so as to limit the player terminal to display the original image without privacy-masking on the corresponding area, only when the player terminal has the privacy unmasking permission(s) set by the image capture terminal. The specific method of setting may include the following manners.

In a first manner, when the privacy masking area information of the original image is the first masking area information and/or the second masking area information, a permission that the original image is not to be privacy-masked is set as the privacy unmasking permission.

That is, a unified privacy unmasking permission is set for the privacy masking area information. When the player terminal has the privacy unmasking permission, that is, the original image may not be privacy-masked, thereby implementing unmasking of any masking area in the original image.

In a second manner, when the privacy masking area information of the original image is the first masking area information and/or the second masking area information, a permission that the first masking area in the original image is not to be privacy-masked is set as a first unmasking permission and/or a permission that the second masking area in the original image is not to be privacy-masked is set as a second unmasking permission. The first masking area is an area indicated by the first masking area information, and the second masking area is an area indicated by the second masking area information.

That is, different unmasking permissions are set for different privacy masking area information. Only when the player terminal has the corresponding unmasking permissions, the player terminal cannot privacy-mask the corresponding masking areas in the original image, thereby implementing unmasking of the corresponding masking areas in the original image based on the corresponding unmasking permissions.

Further, the privacy masking area information and the corresponding privacy unmasking permission may be synthesized to obtain the synthesized masking area information, and the player terminal may parse the synthesized masking area information to obtain the privacy masking area information of the original image and the corresponding privacy unmasking permission.

It should be noted that when the original image is a frame image of the multimedia stream, considering that if the unmasking permission is set in each frame image in the multimedia stream, the player terminal is required to authenticate each frame image in the multimedia stream, and the operation mode would be too complicated. Therefore, in the embodiment of the present application, the unmasking permission may be set only in the specified frame image in the multimedia stream, and when it is determined that the player terminal has the unmasking permission set in the specified frame image, all frame images in the multimedia stream may be unmasked based on the unmasking permission. Wherein, the specified frame may be the first frame or the I-th frame, the P-th frame, and the like in the multimedia stream, which is not limited in this embodiment.

In addition, it should be noted that, the embodiment of the present application is only described as an example of: setting the privacy unmasking permission for the original image in the image capture terminal, and the player terminal enabling unmask the original image when the player terminal has the privacy unmasking permission corresponding to the original image. But in the actual application, the image capture terminal may not set respectively corresponding privacy unmasking permissions for original images, but the player terminal sets acquiescently the unified privacy unmasking permission for all original images provided by the image capture terminal; when the player terminal has the corresponding privacy unmasking permission, the player terminal may unmask all the images provided by the image capture terminal.

At step 203, the image capture terminal provides the original image and the privacy masking area information to the player terminal.

The manner of providing the original image and the privacy masking area information to a player terminal may include: storing the original image and the privacy masking area information, and acquiring, by the player terminal, the stored original image and privacy masking area information from the image capture terminal. For example, the stored original image and privacy masking area information are copied from the image capture terminal; or, the original image and the privacy masking area information are sent to the player terminal.

Further, in order to ensure the security of the original image, and to prevent the player terminal without permission from displaying the original image after acquiring the original image, which will result in user privacy leakage, before the original image and the privacy masking area information are provided to the player terminal, the image capture terminal may further encrypt the original image, thereby providing the encrypted original image and the privacy masking area information to the player terminal By encrypting the original image, it is guaranteed that the original image can be displayed only by the player terminal which is a specially matched and has the corresponding decryption function, and the other third party player terminal or player will not be able to display the original image.

The original image may be encrypted by using a specific key, so that the player terminal can decrypt the encrypted original image only by using the specific key to obtain the original image.

In an embodiment of the present application, the process of providing the original image and the privacy masking area information to a player terminal may include: encoding the original image to obtain a compressed code stream; encrypting the compressed code stream to obtain an encrypted code stream; encapsulating the encrypted code stream and the privacy masking area information to obtain a multimedia stream; and providing the multimedia stream to the player terminal.

Further, encapsulating the encrypted code stream and the privacy masking area information to obtain a multimedia stream may include: encapsulating mixedly the encrypted code stream, the privacy masking area information, and information of other different attributes such as audios, structured descriptors (for example, subtitles) to obtain a multimedia stream.

It should be noted that, in the embodiment of the present application, encrypting of the compressed code stream is only used as an example. In an actual application, the multimedia stream may be encrypted to implement protection of the original image. Accordingly, after the player terminal receives the encrypted multimedia stream, the player terminal is required to decrypt the encrypted multimedia stream to obtain the multimedia stream.

At step 204, the player terminal acquires the original image provided by the image capture terminal and the privacy masking area information of the original image.

The player terminal may acquire the original image and the privacy masking area information from the image capture terminal, and may also receive the original image and the privacy masking area information sent by the player terminal, which is not limited in this embodiment of the present application.

Here, receiving the original image and the privacy masking area information sent by the player terminal includes: the player terminal acquiring the original image from the image capture terminal, and the player terminal identifying the original image to obtain the privacy masking area information.

Acquiring the to-be-masked original image and the privacy masking area information of the original image provided by the image capture terminal may include: acquiring a multimedia stream generated by the image capture terminal, wherein, the multimedia stream is obtained through encapsulating the original image and the privacy masking area information of the original image by the image capture terminal; decapsulating the multimedia stream to obtain the encrypted code stream and the privacy masking area information; decrypting the encrypted code stream by using the code stream key of the encrypted code stream to obtain a compressed code stream; and decoding the compressed code stream to obtain the original image.

In another embodiment of the present application, acquiring the to-be-masked original image and the privacy masking area information of the original image provided by the image capture terminal may include: acquiring a multimedia stream generated by the image capture terminal, wherein, the multimedia stream is obtained through encapsulating the original image by the image capture terminal; decapsulating the multimedia stream to obtain the encrypted code stream; decrypting the encrypted code stream by using the code stream key of the encrypted code stream to obtain a compressed code stream; and decoding the compressed code stream to obtain the original image; and identifying the original image to obtain the privacy masking area information of the original image.

At step 205, the player terminal determines whether to perform privacy-masking on the original image based on whether privacy unmasking permission information is stored; wherein, the privacy unmasking permission information indicates that the original image is not required to be privacy-masked.

The privacy unmasking permission information may be generated based on received authentication information. The authentication information is used for authenticating displaying permission of the original image. That is, the player terminal may determine whether the original image is required to be privacy-masked by authenticating the authentication information.

In a first implementation manner, determining whether the original image is required to be privacy-masked based on whether privacy unmasking permission information is stored may include: determining whether the privacy unmasking permission information is stored; if the privacy unmasking permission information is stored, determining that the original image is not required to be privacy-masked; and, if the privacy unmasking permission information is not stored, determining that the original image is required to be privacy-masked.

Correspondingly, before determining whether the privacy unmasking permission information is stored, the method further includes: receiving the authentication information; determining whether the authentication information conforms to a privacy unmasking permission, wherein the privacy unmasking permission is a permission that the original image is not to be privacy-masked, and the privacy unmasking permission is a permission carried in the original image or a set default permission.

If the authentication information conforms to the privacy unmasking permission, the privacy unmasking permission information is generated and stored.

In addition, if the authentication information does not conform to the privacy unmasking permission, the player terminal may further generate and store the privacy unmasking prohibition information, wherein the privacy unmasking prohibition information indicates that the original image is required to be privacy-masked. Correspondingly, after that, when determining that the privacy unmasking permission information is stored, it may be determined that the original image is required to be privacy-masked.

In a second implementation manner, the privacy masking area information includes first masking area information and/or second masking area information. In this case, determining whether the original image is required to be privacy-masked based on whether privacy unmasking permission information is stored may include:

if the first unmasking permission information is stored, determining that a first masking area in the original image is not required to be privacy-masked; wherein, the first unmasking permission information is privacy unmasking permission information, the first unmasking permission information indicates that the first masking area is not required to be privacy-masked, and the first masking area is an area indicated by the first masking area information; and/or, if the second unmasking permission information is stored, determining that a second masking area in the original image is not required to be privacy-masked; wherein, the second unmasking permission information is privacy unmasking permission information, the second unmasking permission information indicates that the second masking area is not required to be privacy-masked, and the second masking area is an area indicated by the second masking area information.

Specifically, when the privacy masking area information includes the first masking area information, but does not include the second privacy masking information, determining whether the original image is required to be privacy-masked may include: determining whether the first unmasking permission information is stored; if the first unmasking permission information is stored, determining that a first masking area in the original image is not required to be privacy-masked; and if the first unmasking permission information is not stored, determining that the first masking area in the original image is required to be privacy-masked.

When the privacy masking area information includes the second masking area information, but does not include the first privacy masking information, determining whether the original image is required to be privacy-masked may include: determining whether the second unmasking permission information is stored; if the second unmasking permission information is stored, determining that a second masking area in the original image is not required to be privacy-masked; and if the second unmasking permission information is not stored, determining that the second masking area in the original image is required to be privacy-masked.

When the privacy masking area information includes the first masking area information and the second masking area information, determining whether the original image is required to be privacy-masked may include: determining whether the first masking area information and the second masking area information are stored; if the first masking area information and the second masking area information are stored, determining that the original image is not required to be privacy-masked; if the first unmasking permission information is stored, but the second unmasking permission information is not stored, determining that the second masking area in the original image is required to be privacy-masked; if the second unmasking permission information is stored, but the first unmasking permission information is not stored, determining that the first masking area in the original image is required to be privacy-masked; and, if the first masking area information and the second masking area information are not stored; the first masking area information and the second masking area information in the original image is required to be privacy-masked.

Correspondingly, before determining whether the privacy unmasking permission information is stored, the method further includes: receiving the authentication information; if the authentication information conforms to a first unmasking permission, generating and storing the first unmasking permission information, wherein, the first unmasking permission is a permission that the first masking area in the original image is not to be privacy-masked; if the authentication information conforms to a second unmasking permission, generating and storing the second unmasking permission information, wherein, the second unmasking permission is a permission that the second masking area in the original image is not to be privacy-masked; wherein, the first unmasking permission and the second unmasking permission are permissions carried in the original image or set default permissions.

In addition, if the authentication information does not conform to the first unmasking permission, the player terminal may also generate and store the first unmasking prohibition information; wherein, the first unmasking prohibition information indicates that the first masking area is required to be privacy-masked. If the authentication information conforms to a second unmasking permission, the second unmasking prohibition information is generated and stored; wherein, the second unmasking prohibition information indicates that the second masking area is required to be privacy-masked.

Correspondingly, after that, when the first unmasking permission information and the second unmasking prohibition information are stored, it may be determined that the second masking area in the original image is required to be privacy-masked; when the second unmasking permission information and the first unmasking prohibition information are stored, it may be determined that the first masking area in the original image is required to be privacy-masked; and, when the first unmasking prohibition information and the second unmasking prohibition information are stored, it may be determined that the first masking area and the second masking area in the original image are required to be privacy-masked.

In an actual application, the player terminal may authenticate the received authentication information when receiving a display instruction for the original image or a playing instruction for the multimedia stream.

In addition, the method of the player terminal receiving the authentication information may be a manner of the built-in data signature dongle, for example, a USB key (a USB interface hardware device, which has a certain storage space and may store the private key and the data signature) similar to the U shield is inserted in the player terminal Correspondingly, it may be determined whether the authentication information conforms to the privacy unmasking permission by verifying the data signature.

Or, the method of receiving the authentication information may also be a manner of receiving the authorization permission sent by a remote server. Correspondingly, it may be determined whether the authentication information conforms to the privacy unmasking permission by verifying the authentication permission. The embodiment of the present application does not limit the form of the authentication information and the manner of authentication.

At step 206, if the original image is required to be privacy-masked, the player terminal privacy masks the original image based on the privacy masking area information to obtain a masked image, and displays the masked image.

Performing privacy-masking on the original image based on the privacy masking area information includes: based on the privacy masking area information, determining a privacy masking area that is required to be masked in the original image, and performing privacy-masking on the privacy masking area in the original image. For example, the privacy masking area is masked or obscured to form image masking and protect privacy.

For example, the player terminal may set all of pixels within the privacy masking area in the original image to 0, that is, it is painted black to form the image masking, or may obscure the portion within the privacy masking area to form a mosaic or the like.

At step 207, if the original image is not required to be privacy-masked, the player terminal displays the original image.

If the original image is not required to be privacy-masked, the player terminal may not perform any processing on the original image, but directly display the original image, thereby facilitating the user to extract essential information from the original image.

In this case, the masked image may be displayed when requiring the privacy masking, or the original image may be displayed when not requiring the privacy masking, so flexible display of the masked image and the original image is implemented as needed, thereby ensuring, while user privacy is protected, that the essential information can be extracting from the original image when needed, and increasing flexibility.

In an example, a system for capturing and playing an image may include the image capture terminal 10 shown in FIG. 1D and the player terminal 20 shown in FIG. 1F. In an actual application, the capture module 11 in the image capture terminal 10 shown in FIG. 1D may capture an image in the monitored scene, and send the image as the to-be-masked original image to the encoding module 12 and the identification module 17. The encoding module 12 encodes the original image to obtain a compressed code stream, and sends the compressed code stream to the encryption module 13. The encryption module 13 encrypts the compressed code stream to obtain an encrypted code stream, and sends the encrypted code stream to the multimedia encapsulation module 14. The identification module 17 may identify the second masking area information of the original image, and send the second masking area information to the masking information synthesizing module 18. The masking module 16 may acquire the first masking area information manually configured by the user, and send the first masking area information to the masking information synthesizing module 18. The masking information synthesizing module 18 may synthesize the first masking area information and the second masking area information to obtain the synthesized privacy masking area information, and send the synthesized privacy masking area information to the multimedia encapsulation module 14. The multimedia encapsulation module 14 may encapsulate the synthesized privacy masking area information and the encrypted code stream to obtain a multimedia stream, and send the multimedia stream to the player terminal 20 via the output interface 15.

The input interface 21 in the player terminal 20 shown in FIG. 1F may receive the multimedia stream sent by the image capture terminal 10, and send the multimedia stream to the multimedia decapsulation module 22. The multimedia decapsulation module 22 may decapsulate the multimedia stream to obtain the encrypted code stream and the synthesized privacy masking area information, send the encrypted code stream to the decryption module 23, and send the synthesized privacy masking area information to the masking information parse module 29. The decryption module 23 may decrypt the encrypted code stream by the code stream key of the encrypted code stream to obtain a compression code stream, and send the compressed code stream to the decoding module 24. The decoding module 24 may decode the compressed code stream to obtain the original image, and send the original image to the image synthesizing module 27. The masking information parse module 29 may parse the synthesized privacy masking area information to obtain the masking area information that can be identified the image synthesizing module 27. In addition, before the player terminal 20 plays the multimedia stream, or during the player terminal 20 plays the multimedia stream, the authentication module 26 may also receive the authentication information sent by an external device, authenticate the authentication information, and send the privacy unmasking permission information to the image synthesizing module 27 if the authentication information conforms to the privacy unmasking permission. After that, the image synthesizing module 27 may determine that the original image is not required to be privacy-masked based on the received privacy unmasking permission information, and send the original image to the display module 28, and the display module 28 may display the original image. If the image synthesizing module 27 does not receive the unmasking permission information, the image synthesizing module 27 may determine that the original image is required to be privacy-masked, privacy-mask the original image based on the privacy masking area information to obtain a masked image, and send the masked image to the display module 28, and the display module 28 may display the masked image.

In addition, in an example, a system for capturing and playing an image may include the image capture terminal 10 shown in FIG. 1B and the player terminal 20 shown in FIG. 1F, the capture module 11 in the image capture terminal 10 shown in FIG. 1B may send the captured image as an original image to the encoding module 12. The masking module 16 acquires the manually configured first masking area information and send the first masking area information to the multimedia encapsulation module 14. The encoding module 12 and the encryption module 13 process the original image to obtain an encrypted code stream. The multimedia encapsulation module 14 may encapsulate the encrypted code stream and the first masking area information sent by the masking module 16 to obtain a multimedia stream, and send the multimedia stream to the player terminal 20 via the output interface 15.

The player terminal 20 shown in FIG. 1G may decapsulate the received multimedia stream by the multimedia decapsulation module 22 to obtain the first masking area information and the encrypted code stream. The masking information parse module 29 may parse the first masking area information to obtain the identifiable first masking area information. The decryption module 23 and the decoding module 24 may process the encrypted code stream to obtain the original image, and send the original image to the identification module 25. The identification module 25 may identify the original image to obtain the second masking area information. The masking information synthesizing module 30 may synthesize the first masking area information and the second masking area information to obtain the synthesized privacy masking area information. The image synthesizing module 27 may determine whether the original image sent by the encryption module 24 is required to be privacy-masked based on the synthesized privacy masking area information sent by the masking information synthesizing module 30. If the image synthesizing module 27 receives the privacy unmasking permission information, the image synthesizing module 27 may not privacy-mask the original image. If the image synthesizing module 27 does not receive the privacy unmasking permission information, the image synthesizing module 27 may privacy-mask the original image based on the synthesized privacy masking area information to obtain the masked image.

It should be noted that, when the authentication module 26 determines that the authentication information conforms to the privacy unmasking permission, the authentication module 26 may always send the privacy unmasking permission information to the image synthesizing module 27, or may also send the privacy unmasking permission information to the image synthesizing module 27 only once. The image synthesizing module 27 stores the privacy unmasking permission information, determines that the original image is not required to be privacy-masked based on the stored privacy unmasking permission information, and thereby directly displays the original image.

In addition, it should be noted that, in the embodiment of the present application, as an example, the above two systems are described. In an actual application, different image capture terminals 10 and player terminals 20 may also constitute other forms of systems for capturing and playing an image. The specific implementation process may be correspondingly changed based on different systems, which is not limited in this embodiment of the present application.

The method according to the embodiment of the present application may be applied to the field of video monitoring. For a camera installed in a public place or a private place, both the public privacy may be protected as much as possible in the video recorded by the camera, and enough clues may be get from the video in case of problems or illegal crimes, thereby better meeting the needs of different scenes and improving flexibility. Moreover, it should be noted that, in the embodiment of FIG. 2, it can be ensured that whether the manually configured privacy masking area information or the intelligently identified privacy masking area information may be recovered to the masked original image after obtaining the permission, and there is no higher performance requirement for the player terminal.

In summary, in the embodiment of the present application, the to-be-masked original image and the privacy masking area information of the original image provided by the image capture terminal may be acquired. Then based on whether the privacy unmasking permission information is stored, it is determined whether the original image is required to be privacy-masked. If the original image is required to be privacy-masked, the original image is privacy-masked based on the privacy masking area information to obtain the masked image. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

Figure 3:
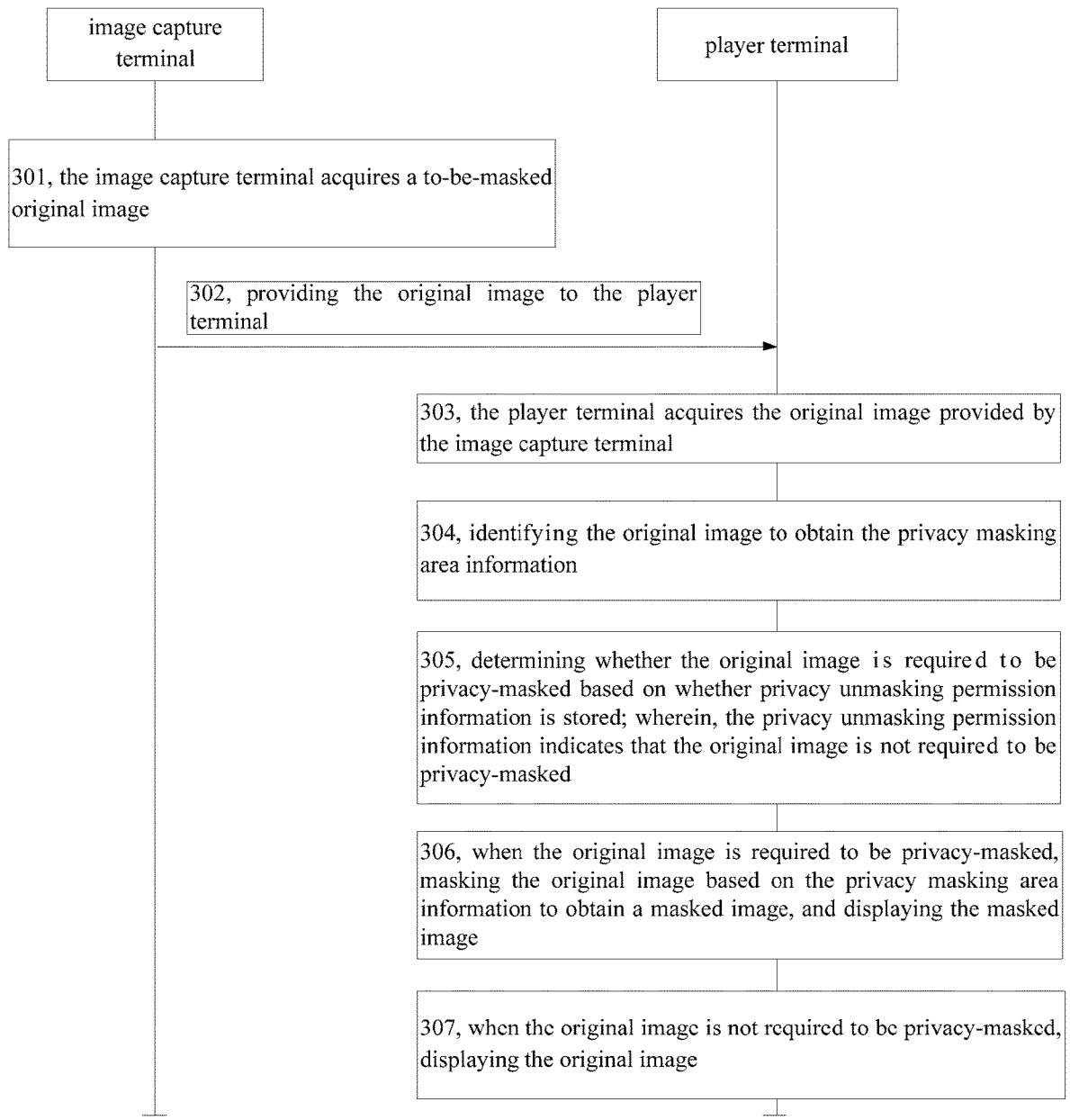
FIG. 3 is another flowchart of a method for displaying an image based on privacy masking according to an embodiment of the present application.

FIG. 3 is a flowchart of a method for displaying an image based on privacy masking according to an embodiment of the present application. Referring to FIG. 3, the method includes:

At step 301, the image capture terminal acquires a to-be-masked original image.

The original image may be an image captured by the image capture terminal, or may be an original image obtained by performing privacy-masking on the captured image based on the first masking area information. The first masking area information is configured by the image capture terminal. The specific implementation process may refer to the related description of the above step 201, which will be not described in the embodiment of the present application.

At step 302, the image capture terminal provides the original image to the player terminal.

Different from the embodiment of FIG. 2, in the embodiment of the present application, the image capture terminal may directly provide the original image to the player terminal without acquiring the privacy masking area of the original image.

In an embodiment of the present application, the process of providing the original image to the player terminal may include: encoding the original image to obtain a compressed code stream; encrypting the compressed code stream to obtain an encrypted code stream; encapsulating the encrypted code stream to obtain a multimedia stream; and providing the multimedia stream to the player terminal. For example, the encrypted code stream, and information of other different attributes such as audios and structured descriptors (for example, subtitles) may be encapsulated mixedly to obtain a multimedia stream.

At step 303, the player terminal acquires the original image provided by the image capture terminal.

The implementation process of the step 303 may refer to the step 204, which will be not described in the embodiment of the present application.

At step 304, the player terminal identifies the original image to obtain the privacy masking area information.

The privacy masking area information is the second masking area information described in the embodiment of FIG. 2.

At step 305, the player terminal determines whether the original image is required to be privacy-masked based on whether privacy unmasking permission information is stored; wherein, the privacy unmasking permission information indicates that the original image is not required to be privacy-masked.

Different from the embodiment of FIG. 3, since the player terminal can only identify the original image to obtain the second masking area information, and accordingly, only can perform privacy-masking on the second masking area in the original image. Therefore, in the embodiment of the present application, only one type of privacy unmasking permission is required to be set.

That is, determining whether the original image is required to be privacy-masked based on whether privacy unmasking permission information is stored, includes: determining whether the privacy unmasking permission information is stored; if the privacy unmasking permission information is stored, determining that the original image is not required to be privacy-masked; and, if the privacy unmasking permission information is not stored, determining that the original image is required to be privacy-masked.

Correspondingly, before determining whether the privacy unmasking permission information is stored, the method further includes: receiving the authentication information, wherein, the authentication information is used for authenticating displaying permission of the original image; determining whether the authentication information conforms to a privacy unmasking permission, wherein the privacy unmasking permission is a permission that the original image is not to be privacy-masked, and the privacy unmasking permission is a permission carried in the original image or a set default permission; if the authentication information conforms to the privacy unmasking permission, generating and storing the privacy unmasking permission information.

At step 306, when the original image is required to be privacy-masked, the player terminal privacy masks the original image based on the privacy masking area information to obtain a masked image, and displays the masked image.

The privacy-masking is performed on the original image based on the privacy masking area information, that is, the privacy-masking is performed on the second masking area in the original image based on the second masking area information.

At step 307, when the original image is not required to be privacy-masked, the player terminal displays the original image.

The specific implementation manner of steps 304-307 may refer to the related description in the embodiment of FIG. 2, which will be not described in the embodiment of the present application.

In this case, the masked image may be displayed when the privacy masking is required, or the original image may be displayed when the privacy masking is not required, so flexible display of the masked image and the original image is implemented as needed, thereby ensuring, while user privacy is protected, that the essential information can be extracting from the original image when needed, and increasing flexibility.

It should be noted that, in the embodiment of FIG. 3, it is only necessary to add a function of encrypting of the image or the code stream at the image capture terminal, which may be implementing by upgrading the firmware without replacing the device, but the player terminal is not required to have the capability of image identification, and may identify a motion area or a specific target in the image.

A system for capturing and playing an image including the image capture terminal 10 shown in FIG. 1B and the player terminal 20 shown in FIG. 1E is taken as an example, in an actual application, the capture module 11 in the image capture terminal 10 may capture an image in the monitored scene, and send the image as a to-be-masked original image to the encoding module 12. The encoding module 12 encodes the original image to obtain a compressed code stream, and sends the compressed code stream to the encryption module 13. The encryption module 13 encrypts the compressed code stream to obtain the encrypted code stream, and sends the encrypted code stream to the multimedia encapsulation module 14. The multimedia encapsulation module 14 may encapsulate the encrypted code stream to obtain a multimedia stream, and may send the multimedia streams to the player terminal 20 via the output interface 15.

Or, the masking module 16 of the image capture terminal 10 shown in FIG. 1B may also acquire the configured first masking area information, privacy-mask the image captured by the capture module 11 based on the first masking area information to obtain the original masking image, and send the original masked image as the original image to the encoding module 12.

As shown in FIG. 1E, the input interface 21 in the player terminal 20 may receive the multimedia stream sent by the image capture terminal 10 and send the multimedia stream to the multimedia decapsulation module 22. The multimedia decapsulation module 22 may decapsulate the multimedia stream to obtain the encrypted code stream, and send the encrypted code stream to the decryption module 23. The decryption module 23 may decrypt the encrypted code stream by the code stream key of the encrypted code stream to obtain a compressed code stream, and send the compressed code stream to the decoding module 24. The decoding module 24 may decode the compressed code stream to obtain the original image, and send the original image to the identification module 25 and the image synthesizing module 27. The identification module 25 may identify the original image to obtain the second masking area information, and send the second masking area information to the image synthesizing module 27.

In addition, before the player terminal 20 plays the multimedia stream, or during the player terminal 20 playing the multimedia stream, the authentication module 26 may also receive the authentication information sent by the external device, authenticate the authentication information, and send the privacy unmasking permission information to the image synthesizing module 27 if the authentication information conforms to the privacy unmasking permission. After that, the image synthesizing module 27 may determine that the original image is not required to be privacy-masked based on the received privacy unmasking permission information, and send the original image to the display module 28, and the display module 28 may display the original image. If the image synthesizing module 27 does not receive the privacy unmasking permission information, the image synthesizing module 27 may determine that the original image is required to be privacy-masked, perform privacy-masking on the second masking area of the original image based on the second masking area information to obtain a masked image, and send the masked image to the display module 28, and the display module 28 may display the masked image.

It should be noted that, in the embodiment of the present application, the system for capturing and playing an image includes the image capture terminal 10 and the player terminal 20 as an example. In an actual application, different image capture terminals 10 and player terminals 20 may also constitute other forms of systems for capturing and playing an image. The specific implementation process may be correspondingly changed based on different systems, which is not limited in this embodiment of the present application.

In summary, in the embodiment of the present application, the to-be-masked original image provided by the image capture terminal may be acquired and the original image is identified to obtain the privacy masking area information. Then, based on whether the privacy unmasking permission information is stored, it is determined whether the original image is required to be privacy-masked. If the original image is required to be privacy-masked, privacy-masking is performed on the original image based on the privacy masking area information to obtain the masked image. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

Figure 4:
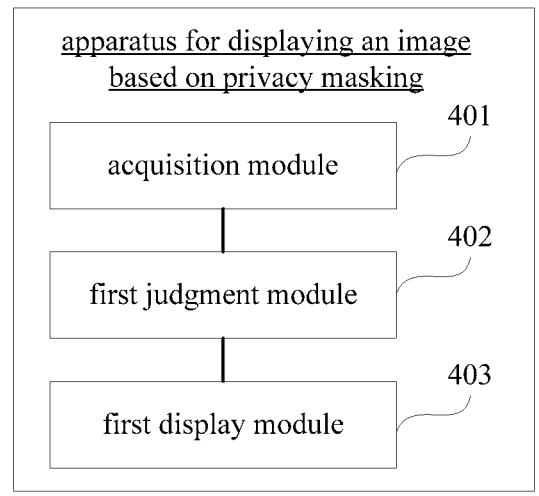
FIG. 4 is a block diagram of an apparatus for displaying an image based on privacy masking according to an embodiment of the present application.

FIG. 4 is a block diagram of an apparatus for displaying an image based on privacy masking according to an embodiment of the present application. Referring to FIG. 4, the apparatus includes:

an acquisition module 401, configured for acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

a first judgment module 402, configured for determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image;

a first display module 403, configured for, if the original image is required to be privacy-masked, performing privacy-masking on the original image based on the privacy masking area information to obtain a masked image, and displaying the masked image.

Optionally, the apparatus further includes:
a second display module, configured for, if the original image is not required to be privacy-masked, displaying the original image.

Optionally, the original image is an image captured by the image capture terminal or an original masked image obtained through performing privacy-masking on the captured image by the image capture terminal based on first masking area information; wherein the first masking area information is configured by the image capture terminal.

Optionally, the first judgment module 402 includes:
a first judgment unit, configured for determining whether the privacy unmasking permission information is stored;

a first determination unit, configured for, if the privacy unmasking permission information is stored, determining that the original image is not required to be privacy-masked; and a second determination unit, configured for, if the privacy unmasking permission information is not stored, determining that the original image is required to be privacy-masked.

Optionally, the apparatus further includes:
a first receiving module, configured for receiving the authentication information;

a second judgment module, configured for determining whether the authentication information conforms to a privacy unmasking permission; wherein the privacy unmasking permission is a permission that the original image is not to be privacy-masked, and the privacy unmasking permission is a permission carried in the original image or a set default permission;

a first generation module, configured for, if the authentication information conforms to the privacy unmasking permission, generating and storing the privacy unmasking permission information.

Optionally, the privacy masking area information comprises: first masking area information and/or second masking area information; the first masking area information is configured by the image capture terminal, and the second masking area information is obtained by identifying the original image;

the first judgment module 402 may include at least one of the following units:

a third determination unit, configured for, if the first unmasking permission information is stored, determining that a first masking area in the original image is not required to be privacy-masked; wherein, the first unmasking permission information indicates that the first masking area is not required to be privacy-masked, and the first masking area is an area indicated by the first masking area information;

a fourth determination unit, configured for, if the second unmasking permission information is stored, determining that a second masking area in the original image is not required to be privacy-masked; wherein, the second unmasking permission information indicates that the second masking area is not required to be privacy-masked, and the second masking area is an area indicated by the second masking area information;

wherein, the first unmasking permission information and the second unmasking permission information are privacy unmasking permission information.

Optionally, the apparatus further includes:

a second receiving module, configured for receiving the authentication information;

a second generation module, configured for, if the authentication information conforms to a first unmasking permission, generating and storing the first unmasking permission information; wherein, the first unmasking permission is a permission that the first masking area in the original image is not to be privacy-masked;

a third generation module, configured for, if the authentication information conforms to a second unmasking permission, generating and storing the second unmasking permission information, wherein, the second unmasking permission a permission that the second masking area in the original image is not to be privacy-masked; and wherein, the first unmasking permission and the second unmasking permission are permissions carried in the original image or set default permissions.

Optionally, the acquisition module 401 includes:

a first acquisition unit, configured for acquiring a first multimedia stream generated by the image capture terminal; wherein, the first multimedia stream is obtained through encapsulating the original image by the image capture terminal;

a first decapsulation unit, configured for decapsulating the first multimedia stream to obtain a first encrypted code stream;

a first decryption unit, configured for decrypting the first encrypted code stream by using a code stream key of the first encrypted code stream to obtain a first compressed code stream;

a first decoding unit, configured for decoding the first compressed code stream to obtain the original image; and an identification unit, configured for identifying the original image to obtain the privacy masking area information.

Optionally, the acquisition module 401 includes:

a second acquisition unit, configured for acquiring a second multimedia stream generated by the image capture terminal; wherein, the second multimedia stream is obtained through encapsulating the original image and the privacy masking area information of the original image by the image capture terminal;

a second decapsulation unit, configured for decapsulating the second multimedia stream to obtain a second encrypted code stream and the privacy masking area information;

a second decryption unit, configured for decrypting the second encrypted code stream by using a code stream key of the second encrypted code stream to obtain a second compressed code stream; and a second decoding unit, configured for decoding the second compressed code stream to obtain the original image.

In the embodiments of the present application, a to-be-masked original image provided by an image capture terminal and privacy masking area information of the original image may be acquired; wherein, the privacy masking area information may be obtained by identifying the original image or be obtained from the image capture terminal and indicate an area in the original image which is required to be masked; then, it may be determined whether the original image is required to be privacy-masked based on whether privacy unmasking permission information is stored; if the original image is required to be privacy-masked, the original image is privacy-masked based on the privacy masking area information to obtain a masked image. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

Figure 5:
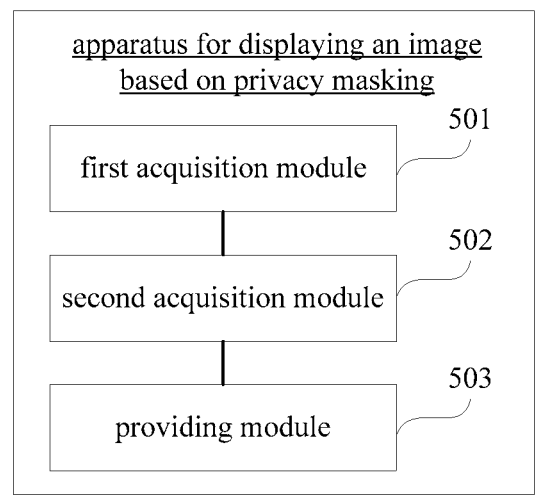
FIG. 5 is another block diagram of an apparatus for displaying an image based on privacy masking according to an embodiment of the present application.

FIG. 5 is a block diagram of an apparatus for displaying an image based on privacy masking according to an embodiment of the present application. Referring to FIG. 5, the apparatus includes:

a first acquisition module 501, configured for acquiring a to-be-masked original image;

a second acquisition module 502, configured for acquiring privacy masking area information of the original image; wherein, the privacy masking area information indicates an area in the original image which is required to be masked; and a providing module 503, configured for providing the original image and the privacy masking area information to a player terminal, so that the player terminal determines whether to perform privacy-masking on the original image based on the privacy masking area information.

Optionally, the first acquisition module 501 may include at least one of the following units:

a first determination unit, configured for acquiring an image captured for a monitored scene, and determining the captured image as the original image;

a second determination unit, configured for acquiring an image captured for a monitored scene; acquiring configured first masking area information; performing privacy-masking on the captured image based on the first masking area information to obtain an original masked image; and determining the original masked image as the original image.

Optionally, the providing module 503 includes:

an encoding unit, configured for encoding the original image to obtain a compressed code stream;

an encryption unit, configured for encrypting the compressed code stream to obtain an encrypted code stream;

an encapsulation unit, configured for encapsulating the encrypted code stream and the privacy masking area information to obtain a multimedia stream; and a providing unit, configured for providing the multimedia stream to the player terminal.

Optionally, the second acquisition module 502 may include at least one of the following units:

a third determination unit, configured for determining configured first masking area information as the privacy masking area information of the original image;

a fourth determination unit, configured for identifying the original image to obtain second masking area information, and determining the second masking area information as the privacy masking area information of the original image.

Optionally, the apparatus further includes:

a first setting module, configured for, when the privacy masking area information of the original image is the first masking area information and/or the second masking area information, setting a permission that the original image is not to be privacy-masked as a privacy unmasking permission; or a second setting module, configured for, when the privacy masking area information of the original image is the first masking area information and/or the second masking area information, setting a permission that a first masking area in the original image is not to be privacy-masked as a first unmasking permission, and/or setting a permission that a second masking area in the original image is not to be privacy-masked as a second unmasking permission; wherein, the first masking area is an area indicated by the first masking area information, and the second masking area is an area indicated by the second masking area information.

In the embodiment of the present application, a to-be-masked original image and privacy masking area information of the original image may be acquired; wherein, the privacy masking area information indicates an area in the original image which is required to be masked. The original image and the privacy masking area information are provided to the player terminal, and the player terminal determines whether to perform privacy-masking on the original image based on the privacy masking area information. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

It should be noted that the apparatuses for displaying an image based on the privacy masking according to the embodiments of FIG. 4 and FIG. 5, when displaying an image, are only illustrated by the division of all of above functional modules. In an actual application, the above functions can be respectively completed by different functional modules as needed, that is, the internal structure of the device is divided into different functional modules to complete all or part of the above described functions. In addition, the apparatuses for displaying an image based on the privacy masking according to the embodiments of FIG. 4 and FIG. 5 have concept the same as that of the embodiment of the method for displaying the image based on the privacy masking, and the specific implementation process thereof is described in detail in the method embodiment which is not described herein.

Figure 6:
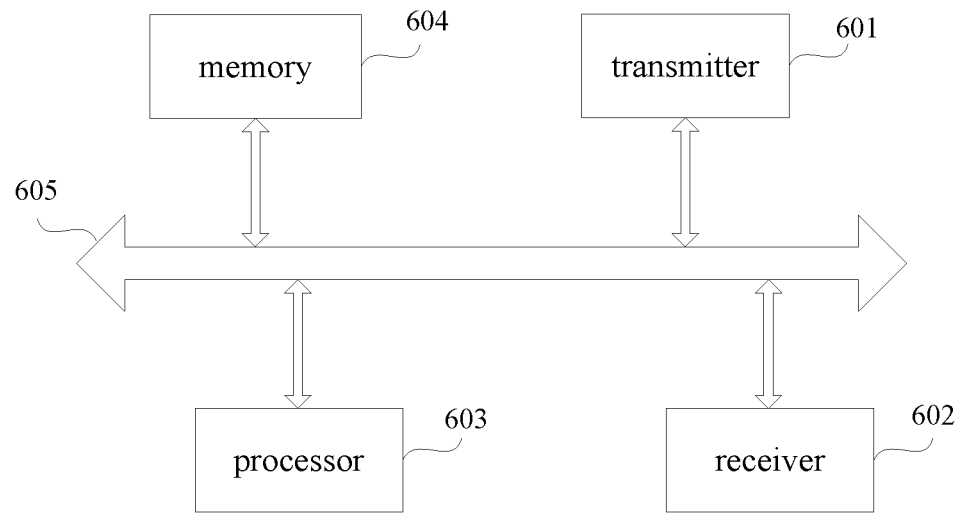
FIG. 6 is a schematic structural diagram of a player terminal 600 according to an embodiment of the present application.

FIG. 6 is a schematic structural diagram of a player terminal 600 according to an embodiment of the present application. The player terminal 600 mainly includes a transmitter 601, a receiver 602, and a processor 603 including one or more processing cores, a memory 604 including one or more computer readable storage media, a communication bus 605, and the like. It will be understood by those skilled in the art that the player terminal is not limited by the structure of the player terminal shown in FIG. 6, and, compared to the illustrated structure, may include more or less components, may be combined with some components, or may include different component arrangements, which is not limited in the embodiment of the present application.

The receiver 602 may be configured for receiving data sent by the image capture terminal, such as an image, privacy masking information, a video stream, and the like.

The memory 604 may be configured for storing data sent by the image capture terminal, and the memory 604 may also be configured for storing one or more running programs and/or modules for performing the above method for displaying an image based on privacy masking.

The processor 603 may be a common central processing unit (hereinafter referred to as CPU), a microprocessor, an application-specific integrated circuit (hereinafter referred to as ASIC), or one or more integrated circuits for controlling the execution of the program of the technical solution of the present application. Wherein, the processor 603 may implement the method according to the above embodiment of FIG. 2 or FIG. 3 by running or executing a software program and/or module stored in the memory 604 and calling data stored in the memory 604.

The memory 604 may be a read-only memory (hereinafter referred to as ROM) or other types of static storage devices that may store static information and instructions, a random access memory (hereinafter referred to as RAM) or other types of dynamic storage devices that may store information and instructions, or may also be an electrically erasable programmable read-only memory (hereinafter referred to as EEPROM), a compact disc read-only memory (hereinafter referred to as CD-ROM) or other optical disc storages, optical disk storages (including a compressed disk, a laser disk, an optical disk, digital common disk, Blu-ray disk, etc.), a magnetic disk storage medium or other magnetic storage devices, or any other medium that can be configured for carrying or storing desired program code in the form of an instruction or data structure and can be accessed by the integrated circuit, but is not limited thereto. The memory 604 may be present independently and connected to the processor 603 via the communication bus 605. The memory 604 may also be integrated with the processor 603.

Additionally, the communication bus 605 may include a path for transmitting information between the processor 603 and the memory 604.

Figure 7:
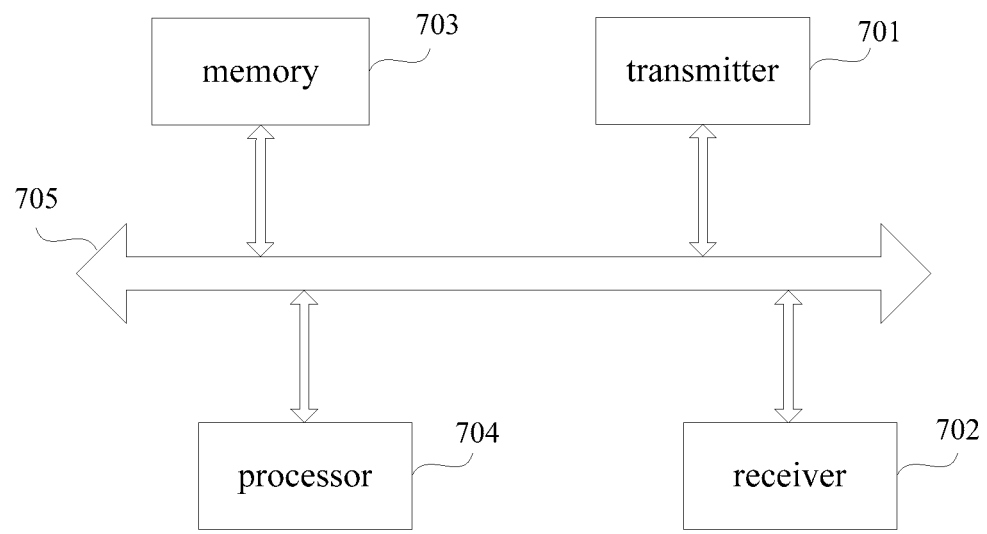
FIG. 7 is a schematic structural diagram of an image capture terminal 700 according to an embodiment of the present application.

FIG. 7 is a schematic structural diagram of an image capture terminal 700 according to an embodiment of the present application. The image capture terminal 700 mainly includes a transmitter 701, a receiver 702, a memory 703, a processor 704, and a communication bus 705. It will be understood by those skilled in the art that the image capture terminal is not limited by the structure of the image capture terminal 700 shown in FIG. 7, and, compared to the illustrated structure, may include more or less components, may be combined with some components, or may include different component arrangements, which is not limited in the embodiment of the present application.

The transmitter 701 may be configured for sending data to the player terminal, such as an image, privacy masking information, a video stream, or the like.

The memory 703 may be configured for storing the captured image, and the memory 703 may also be configured for storing one or more running programs and/or modules for performing the above method for displaying an image based on privacy masking.

The processor 704 may be a common CPU, a microprocessor, an ASIC, or one or more integrated circuits for controlling the execution of the program of the technical solution of the present application. The processor 704 may implement the method according to the above embodiment of FIG. 2 or FIG. 3 by running or executing a software program and/or module stored in the memory 703 and calling data stored in the memory 703.

The communication bus 705 may include a path for transmitting information between the processor 704 and the memory 703.

The embodiment of the present application also provide a player terminal. The player terminal includes: a housing, a processor, a memory, a circuit board and a power circuit; wherein, the circuit board is arranged inside space surrounded by the housing; the processor and the memory are arranged on the circuit board; the power circuit is configured for supplying power to each of circuits or components of the player terminal; the memory is configured for storing an executable program code; the processor is configured to execute the executable program code stored in the memory for:

acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image; and if the original image is required to be privacy-masked, performing privacy-masking on the original image based on the privacy masking area information to obtain a masked image, and displaying the masked image.

In the embodiments of the present application, a to-be-masked original image provided by an image capture terminal and privacy masking area information of the original image may be acquired; wherein, the privacy masking area information may be obtained by identifying the original image or be obtained from the image capture terminal and indicate an area in the original image which is required to be masked; then, it may be determined whether the original image is required to be privacy-masked based on whether privacy unmasking permission information is stored; if the original image is required to be privacy-masked, the original image is privacy-masked based on the privacy masking area information to obtain a masked image. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

The embodiment of the present application also provide an image capture terminal. The image capture terminal includes: a housing, a processor, a memory, a circuit board and a power circuit; wherein, the circuit board is arranged inside space surrounded by the housing; the processor and the memory are arranged on the circuit board; the power circuit is configured for supplying power to each of circuits or components of the image capture terminal; the memory is configured for storing an executable program code; the processor is configured to execute the executable program code stored in the memory for:

acquiring a to-be-masked original image;

acquiring privacy masking area information of the original image; wherein, the privacy masking area information indicates an area in the original image which is required to be masked; and providing the original image and the privacy masking area information to a player terminal, so that the player terminal determines whether to perform privacy-masking on the original image based on the privacy masking area information.

In the embodiment of the present application, a to-be-masked original image and privacy masking area information of the original image may be acquired; wherein, the privacy masking area information indicates an area in the original image which is required to be masked. The original image and the privacy masking area information are provided to the player terminal, and the player terminal determines whether the original image is privacy-masked based on the privacy masking area information. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

An embodiment of the present application also provides an executable program code, and the executable program code is configured for, when being executed, implementing the following steps:

acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image; and if the original image is required to be privacy-masked, performing privacy-masking on the original image based on the privacy masking area information to obtain a masked image, and displaying the masked image.

In the embodiments of the present application, a to-be-masked original image provided by an image capture terminal and privacy masking area information of the original image may be acquired; wherein, the privacy masking area information may be obtained by identifying the original image or be obtained from the image capture terminal and indicate an area in the original image which is required to be masked; then, it may be determined whether the original image is required to be privacy-masked based on whether privacy unmasking permission information is stored; if the original image is required to be privacy-masked, the original image is privacy-masked based on the privacy masking area information to obtain a masked image. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

An embodiment of the present application also provides an executable program code, and the executable program code is configured for, when being executed, implementing the following steps:

acquiring a to-be-masked original image;

acquiring privacy masking area information of the original image; wherein, the privacy masking area information indicates an area in the original image which is required to be masked; and providing the original image and the privacy masking area information to a player terminal, so that the player terminal determines whether to perform privacy-masking on the original image based on the privacy masking area information.

In the embodiment of the present application, a to-be-masked original image and privacy masking area information of the original image may be acquired; wherein, the privacy masking area information indicates an area in the original image which is required to be masked. The original image and the privacy masking area information are provided to the player terminal, and the player terminal determines whether the original image is privacy-masked based on the privacy masking area information. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

An embodiment of the present application also provides a storage medium, configured for storing an executable program code, and the executable program code is configured for, when being executed, implementing the following steps:

acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;

determining whether the original image is required to be privacy-masked based on whether privacy unmasking permission information is stored; wherein, the privacy unmasking permission information is configured for indicating that the original image is not required to be privacy-masked, and the privacy unmasking permission information is generated based on received authentication information; the authentication information is configured for authenticating displaying permission of the original image; and if the original image is required to be privacy-masked, performing privacy-masking on the original image based on the privacy masking area information to obtain a masked image, and displaying the masked image.

In the embodiments of the present application, a to-be-masked original image provided by an image capture terminal and privacy masking area information of the original image may be acquired; wherein, the privacy masking area information may be obtained by identifying the original image or be obtained from the image capture terminal and indicates an area in the original image which is required to be masked; then, it may be determined whether the original image is required to be privacy-masked based on whether privacy unmasking permission information is stored; if the original image is required to be privacy-masked, the original image is privacy-masked based on the privacy masking area information to obtain a masked image. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

An embodiment of the present application also provides a storage medium, configured for storing an executable program code, and the executable program code is configured for, when being executed, implementing the following steps:

acquiring a to-be-masked original image;

acquiring privacy masking area information of the original image; wherein, the privacy masking area information indicates an area in the original image which is required to be masked; and providing the original image and the privacy masking area information to a player terminal, so that the player terminal determines whether to perform privacy-masking on the original image based on the privacy masking area information.

In the embodiment of the present application, a to-be-masked original image and privacy masking area information of the original image may be acquired; wherein, the privacy masking area information indicates an area in the original image which is required to be masked. The original image and the privacy masking area information are provided to the player terminal, and the player terminal determines whether the original image is privacy-masked based on the privacy masking area information. In this way, the image capture terminal is only required to provide an original image, and the player terminal may determine whether the original image provided by the image capture terminal is required to be privacy-masked by external authentication, thereby realizing the protection of the user privacy. Since the image capture terminal is not required to provide both an original image and a masked image, the cost of storage or transmission is low, thereby saving the storage resources and network resources of the image capture terminal.

All of the embodiments in the description are described in a correlated manner, and identical or similar parts in various embodiments can refer to one another. In addition, the description for each embodiment focuses on the differences from other embodiments. In particular, the embodiments of the apparatus, the player terminal, the image capture terminal, the executable program code and the storage medium are described briefly since they are substantially similar to the embodiment of the method. Related contents can refer to the part that describes the embodiment of the method.

It can be understood by those skills in the art that all or a part of steps in the above embodiments may be accomplished by hardware or by instructing related hardware through programs, which may be stored in a computer-readable storage medium, such as a read-only memory, a disk, an optical disk, or the like.

The above embodiments are simply preferable embodiments of the present application, and are not intended to limit the present application. Any modifications, alternatives, improvements, or the like within the spirit and principle of the present application shall be included within the scope of protection of the present application.

The invention claimed is:

1. A method for displaying an image based on privacy masking, comprising:
   acquiring a to-be-masked original image provided by an image capture terminal and privacy masking area information of the original image; wherein, the privacy masking area information is obtained by identifying the original image or is obtained from the image capture terminal; the privacy masking area information indicates an area in the original image which is required to be masked;
   receiving authentication information configured for authenticating displaying permission of the original image;
   determining whether the authentication information conforms to a privacy unmasking permission; wherein the privacy unmasking permission is a permission that the original image is not to be privacy-masked, and the privacy unmasking permission is a permission carried in the original image or a set default permission, the privacy unmasking permission is set by the image capture terminal;
   when the authentication information conforms to the privacy unmasking permission, generating and storing the privacy unmasking permission information, wherein, the privacy unmasking permission information is configured for indicating that the original image is not required to be privacy-masked, and the privacy unmasking permission information is generated based on received authentication information;
   determining whether the original image is required to be privacy-masked based on whether privacy unmasking permission information is stored;
   wherein, determining whether the original image is required to be privacy-masked based on whether privacy unmasking permission information is stored comprises:
      determining whether the privacy unmasking permission information is stored;
      when the privacy unmasking permission information is stored, determining that the original image is not required to be privacy-masked;
      when the privacy unmasking permission information is not stored, determining that the original image is required to be privacy-masked; and
   when the original image is required to be privacy-masked, performing privacy-masking on the original image based on the privacy masking area information to obtain a masked image, and displaying the masked image.

2. The method of claim 1, further comprising:
   when the original image is not required to be privacy-masked, displaying the original image.

3. The method of claim 1, wherein, the original image is an image captured by the image capture terminal or an original masked image obtained through performing privacy-masking on the captured image by the image capture terminal based on first masking area information; wherein the first masking area information is configured by the image capture terminal.

4. The method of claim 1, wherein, the privacy masking area information comprises at least one of: first masking area information and second masking area information; the first masking area information is configured by the image capture terminal, and the second masking area information is obtained by identifying the original image; and
   wherein determining whether the original image is required to be privacy-masked based on whether privacy unmasking permission information is stored comprises:
      when the first unmasking permission information is stored, determining that a first masking area in the original image is not required to be privacy-masked; wherein, the first unmasking permission information indicates that the first masking area is not required to be privacy-masked, and the first masking area is an area indicated by the first masking area information;
      when the second unmasking permission information is stored, determining that a second masking area in the original image is not required to be privacy-masked; wherein, the second unmasking permission information indicates that the second masking area is not required to be privacy-masked, and the second masking area is an area indicated by the second masking area information;
      when the first masking area information and the second masking area information is stored, determining that the first masking area and the second masking area in the original image are not required to be privacy-masked;
   wherein, the first unmasking permission information and the second unmasking permission information are privacy unmasking permission information.

5. The method of claim 4, wherein, before determining whether the original image is required to be privacy-masked based on whether privacy unmasking permission information is stored, the method further comprises:
   receiving the authentication information;
   when the authentication information conforms to a first unmasking permission, generating and storing the first unmasking permission information; wherein, the first unmasking permission is a permission that the first masking area in the original image is not to be privacy-masked;
   when the authentication information conforms to a second unmasking permission, generating and storing the second unmasking permission information, wherein, the second unmasking permission a permission that the second masking area in the original image is not to be privacy-masked; and
   wherein, the first unmasking permission and the second unmasking permission are permissions carried in the original image or set default permissions.

6. The method of claim 1, wherein, acquiring a to-be-masked original image provided by an image capture terminal and privacy masking area information of the original image comprises:
   acquiring a first multimedia stream generated by the image capture terminal; wherein, the first multimedia stream is obtained through encapsulating the original image by the image capture terminal;
   decapsulating the first multimedia stream to obtain a first encrypted code stream;
   decrypting the first encrypted code stream by using a code stream key of the first encrypted code stream to obtain a first compressed code stream;
   decoding the first compressed code stream to obtain the original image; and
   identifying the original image to obtain the privacy masking area information.

7. The method of claim 1, wherein, acquiring a to-be-masked original image provided by an image capture terminal and privacy masking area information of the original image comprises:
  acquiring a second multimedia stream generated by the image capture terminal; wherein, the second multimedia stream is obtained through encapsulating the original image and the privacy masking area information of the original image by the image capture terminal;
  decapsulating the second multimedia stream to obtain a second encrypted code stream and the privacy masking area information;
  decrypting the second encrypted code stream by using a code stream key of the second encrypted code stream to obtain a second compressed code stream; and
  decoding the second compressed code stream to obtain the original image.

8. A method for displaying an image based on privacy masking, comprising:
  acquiring a to-be-masked original image;
  acquiring privacy masking area information of the original image; wherein, the privacy masking area information indicates an area in the original image which is required to be masked; and
  providing the original image and the privacy masking area information to a player terminal, so that the player terminal determines whether to perform privacy-masking on the original image based on the privacy masking area information, wherein when the player terminal receives authentication information that conforms to a privacy unmasking permission, the player terminal generates and stores privacy unmasking permission information, and when the player terminal determines that the privacy unmasking permission information is stored, the player terminal determines that the original image is not required to be privacy-masked, and wherein the privacy unmasking permission is a permission that the original image is not to be privacy-masked, the privacy unmasking permission is a permission carried in the original image or a set default permission, the privacy unmasking permission is set by an image capture terminal the privacy unmasking permission information is configured for indicating that the original image is not required to be privacy-masked, and the authentication information is configured for authenticating displaying permission of the original image.

9. The method of claim 8, wherein, acquiring a to-be-masked original image comprises:
  acquiring an image captured for a monitored scene, and determining the captured image as the original image; or
  acquiring an image captured for a monitored scene; acquiring configured first masking area information; performing privacy-masking on the captured image based on the first masking area information to obtain an original masked image; and determining the original masked image as the original image.

10. The method of claim 8, wherein, providing the original image and the privacy masking area information to a player terminal comprises:
  encoding the original image to obtain a compressed code stream;
  encrypting the compressed code stream to obtain an encrypted code stream;
  encapsulating the encrypted code stream and the privacy masking area information to obtain a multimedia stream; and
  providing the multimedia stream to the player terminal.

11. The method of claim 8, wherein, acquiring privacy masking area information of the original image comprises at least one of the following operations:
  determining configured first masking area information as the privacy masking area information of the original image;
  identifying the original image to obtain second masking area information, and determining the second masking area information as the privacy masking area information of the original image.

12. The method of claim 11, wherein, before providing the original image and the privacy masking area information to a player terminal, the method further comprises:
  when the privacy masking area information of the original image is at least one of the first masking area information and the second masking area information, setting a permission that the original image is not to be privacy-masked as a privacy unmasking permission; or
  when the privacy masking area information of the original image is the first masking area information, setting a permission that a first masking area in the original image is not to be privacy-masked as a first unmasking permission, when the privacy masking area information of the original image is the second masking area information, setting a permission that a second masking area in the original image is not to be privacy-masked as a second unmasking permission, when the privacy masking area information of the original image is the first masking area information and the second masking area information, setting a permission that a first masking area in the original image is not to be privacy-masked as a first unmasking permission and setting a permission that a second masking area in the original image is not to be privacy-masked as a second unmasking permission; wherein, the first masking area is an area indicated by the first masking area information, and the second masking area is an area indicated by the second masking area information.

13. A player terminal, comprising: a housing, a processor, a memory, a circuit board and a power circuit; wherein, the circuit board is arranged inside a space surrounded by the housing; the processor and the memory are arranged on the circuit board; the power circuit is configured for supplying power to each of circuits or components of the player terminal; the memory is configured for storing an executable program code; the processor is configured to execute the executable program code stored in the memory for implementing the method of claim 1.

14. An image capture terminal, comprising: a housing, a processor, a memory, a circuit board and a power circuit; wherein, the circuit board is arranged inside a space surrounded by the housing; the processor and the memory are arranged on the circuit board; the power circuit is configured for supplying power to each of circuits or components of the image capture terminal; the memory is configured for storing an executable program code; the processor is configured to execute the executable program code stored in the memory for implementing the method of claim 8.

15. A non-transitory computer readable storage medium, configured for storing an executable program code; wherein, the executable program code is configured for, when being executed, implementing the method of claim 1.

16. A non-transitory computer readable storage medium, configured for storing an executable program code; wherein, the executable program code is configured for, when being executed, implementing the method of claim 8.

* * * * *